(12) United States Patent
Yedidi et al.

(10) Patent No.: US 12,532,010 B2
(45) Date of Patent: Jan. 20, 2026

(54) METHODS AND APPARATUS TO IMPLEMENT PREDICTOR PREFETCHING IN VIDEO ENCODING

(71) Applicant: Intel Corporation, Santa Clara, CA (US)

(72) Inventors: Satya Yedidi, Roseville, CA (US); Srivallaba Mysore, Folsom, CA (US); Shriram Deshpande, Rancho Cordova, CA (US)

(73) Assignee: Intel Corporation, Santa Clara, CA (US)

( * ) Notice: Subject to any disclaimer, the term of this patent is extended or adjusted under 35 U.S.C. 154(b) by 605 days.

(21) Appl. No.: 17/853,719

(22) Filed: Jun. 29, 2022

(65) Prior Publication Data

US 2022/0329835 A1 Oct. 13, 2022

(51) Int. Cl.
*H04N 19/423* (2014.01)
*H04N 19/105* (2014.01)
*H04N 19/176* (2014.01)
*H04N 19/88* (2014.01)

(52) U.S. Cl.
CPC ......... *H04N 19/423* (2014.11); *H04N 19/105* (2014.11); *H04N 19/176* (2014.11); *H04N 19/88* (2014.11)

(58) Field of Classification Search
CPC .. H04N 19/105; H04N 19/176; H04N 19/423; H04N 19/50; H04N 19/88
See application file for complete search history.

(56) References Cited

U.S. PATENT DOCUMENTS

| 2008/0130751 | A1* | 6/2008 | Kobayakawa | H04N 19/159 |
| | | | | 375/E7.17 |
| 2009/0089540 | A1* | 4/2009 | Hansen | G06F 9/3824 |
| | | | | 712/E9.002 |
| 2013/0136181 | A1* | 5/2013 | Amitay | H04N 19/533 |
| | | | | 375/E7.243 |
| 2014/0192583 | A1* | 7/2014 | Rajan | G11C 7/10 |
| | | | | 365/63 |
| 2014/0219356 | A1* | 8/2014 | Nishitani | H04N 19/51 |
| | | | | 375/240.16 |
| 2015/0016536 | A1* | 1/2015 | Hsieh | H04N 19/625 |
| | | | | 375/240.18 |
| 2016/0299847 | A1* | 10/2016 | Chishti | G06F 9/3808 |
| 2016/0350215 | A1* | 12/2016 | Reed | G06F 11/0793 |

(Continued)

*Primary Examiner* — Anner Holder
(74) *Attorney, Agent, or Firm* — Hanley, Flight & Zimmerman, LLC

(57) ABSTRACT

Methods, apparatus, systems, and articles of manufacture are disclosed to implement predictor prefetching in video encoding. The example apparatus includes processor circuitry to perform operations to instantiate a predictor list generator circuitry and a predictor prefetch circuitry. The example predictor list generator circuitry to obtain predictor candidates indicating memory locations storing reference blocks from a previous block and sort the predictor candidates in a priority order. The example predictor prefetch circuitry to send cache line requests to the memory corresponding to at least some the predictor candidates that satisfy a threshold priority value. The example predictor prefetch circuitry to send the cache line requests to the memory before a reference block winner of the previous block is determined.

25 Claims, 13 Drawing Sheets

(56) References Cited

U.S. PATENT DOCUMENTS

| | | | |
|---|---|---|---|
| 2017/0280137 A1* | 9/2017 | Tanaka | H04N 19/433 |
| 2018/0293698 A1* | 10/2018 | Venkatesh | G06T 1/20 |
| 2021/0049100 A1* | 2/2021 | Roberts | G06F 3/0679 |
| 2022/0060739 A1* | 2/2022 | Yu | H04N 19/105 |

* cited by examiner

| Test Content | Memory Compression | No Predictor Prefetch (milliseconds) | Predictor prefetch enabled (milliseconds & improvement percentage) | Predictor prefetch enabled + left predictor dependency disable for fetch (milliseconds & improvement percentage) |
|---|---|---|---|---|
| P frame Average (128 frames) | OFF | 18.55 | 13.75 (25.88%) | 13.20 (28.84%) |
| B frame Average (838 frames) | OFF | 19.5 | 19.45 (.26%) | 13.30 (31.79%) |
| P frame Average (128 frames) | ON | 14.55 | 13.15 (9.62%) | 13.17 (9.48%) |
| B frame Average (838 frames) | ON | 15.86 | 14.92 (5.93%) | 13.18 (16.89%) |

FIG. 13

METHODS AND APPARATUS TO IMPLEMENT PREDICTOR PREFETCHING IN VIDEO ENCODING

FIELD OF THE DISCLOSURE

This disclosure relates generally to video encoding and, more particularly, to methods and apparatus to implement reference pixel prefetching in video encoding.

BACKGROUND

Motion estimation by searching reference frames for motion is important for video encoding. When searching frames of a video stream for motion, a source block of pixels in a certain position in a current frame of the video is used to search reference blocks of pixels in a series of positions in a reference frame (e.g., previous frame) of the video. The closest match between the contents of a reference block in a position in the reference frame and the source block in the current frame is used to determine motion between the two frames. The pixel search area used for the best match look up in the reference frame is generally dictated by the overall encoder performance expectations. Encoder performance is generally tied to the target usages, which range from focusing on quality (e.g., a larger pixel search area for the block) to focusing on the fastest performance (e.g., a smaller pixel search area for the block).

BRIEF DESCRIPTION OF THE DRAWINGS

FIG. 13 illustrates performance data when utilizing predictor prefetch enabled in processor Silicon.

In general, the same reference numbers will be used throughout the drawing(s) and accompanying written description to refer to the same or like parts. The figures are not to scale.

Figure 1:
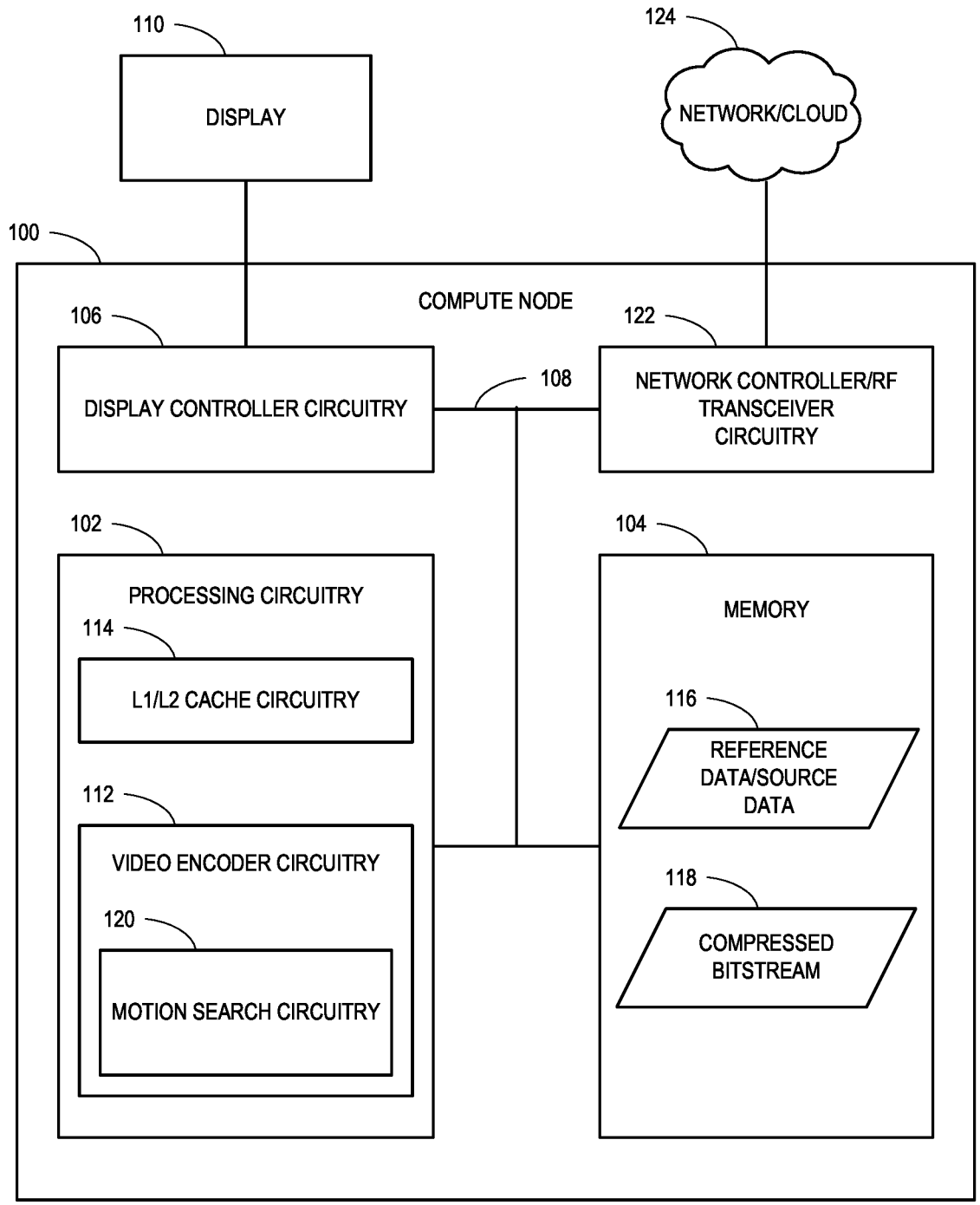
FIG. 1 is an illustration of an example compute node to implement predictor prefetching for video encoding.

As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

As used herein, "processor circuitry" is defined to include (i) one or more special purpose electrical circuits structured to perform specific operation(s) and including one or more semiconductor-based logic devices (e.g., electrical hardware implemented by one or more transistors), and/or (ii) one or more general purpose semiconductor-based electrical circuits programmable with instructions to perform specific operations and including one or more semiconductor-based logic devices (e.g., electrical hardware implemented by one or more transistors). Examples of processor circuitry include programmable microprocessors, Field Programmable Gate Arrays (FPGAs) that may instantiate instructions, Central Processor Units (CPUs), Graphics Processor Units (GPUs), Digital Signal Processors (DSPs), XPUs, or microcontrollers and integrated circuits such as Application Specific Integrated Circuits (ASICs). For example, an XPU may be implemented by a heterogeneous computing system including multiple types of processor circuitry (e.g., one or more FPGAs, one or more CPUs, one or more GPUs, one or more DSPs, etc., and/or a combination thereof) and application programming interface(s) (API(s)) that may assign computing task(s) to whichever one(s) of the multiple types of processor circuitry is/are best suited to execute the computing task(s).

DETAILED DESCRIPTION

Motion vector search techniques are a key to efficient video encoding. Motion vectors are vectors that describe the differences between a source block position (e.g., a block of X×Y pixels in a current frame of the video stream) and a reference block position (e.g., a block of $X_1 \times Y_1$ pixels in a previous frame of the video stream). One bottleneck in video stream encoding relates to motion vector searches. To search for matching data between source and reference blocks, the source data and reference data (e.g., raw pixel data of frames of the video stream) are requested from locations in memory.

In some examples, fetching the source and reference data from memory includes a round trip latency of a memory access request being sent to memory and the retrieved data returning from memory and stored in a local buffer for analysis by the video encoding hardware. The round trip navigates a memory hierarchy with multi-level caching and interconnects, which takes valuable time. From an efficiency perspective, keeping the video encoding hardware, performing motion search busy as much as possible is beneficial. If the video encoding hardware must wait for data from memory, the motion search portion of the video encoding pipeline stalls. A motion search process with no memory fetch stalls positively impacts overall video encoder performance.

In some examples, example block search circuitry implements a motion search using a hierarchical two-level (or greater than two-level) search, using an integer search on a bigger region of a reference frame followed by a fractional refinement based on an integer search result (e.g., an example best integer search result). Searching an entire reference frame for motion is computationally intensive based on the number of possibilities of motion to analyze. Instead, a video encoder implements algorithms to formulate a list of predictors (e.g., predictor candidates). The predictor candidates are motion vectors describing the movement of pixel data between a source block at a position in a source frame and a reference block at a position in a reference frame. Some predictor candidates include global motion input predictors that interpret global motion of an entire frame as an indicator of the motion of a specific block, spatial predictors that assume the motion of the pixel data from a reference block to the source block is likely to be within a local neighborhood of locations from the source block location, and temporal predictors that consider the same block pixel location of the reference and source blocks (e.g., when an object in the block has no motion between frames), among other predictor candidates. Predictor candidate types will be discussed in greater detail below. A total number of predictor candidates, each pointing to a reference block for motion search, are fetched and then searched to find the best match.

Example predictor prefetch circuitry disclosed herein prefetches predictor candidates to populate one or more caches with reference block data that will be fetched by a fetch circuitry (in a motion search circuitry) in a video encoder. The example predictor prefetch circuitry sends cache line requests to a memory corresponding to predictor candidates. In some examples, each predictor candidate references a memory location that is the start of a reference block, and the reference block corresponds to multiple cache lines of data in the memory. Thus, fetching each predictor candidate reference block corresponds to sending multiple cache line requests to memory. In some examples, the predictor prefetch circuitry prefetches a number of cache lines from memory equal to a number of predictor candidates used for motion search for a current source block. In some examples, the predictor prefetch circuitry sends the cache line requests to the memory before a reference block winner of the previous block is determined. A reference block winner means a reference block corresponding to one of the list of predictor candidates from the previous motion search process that was determined to be the best match (e.g., the closest predictor candidate for the motion of the content between the source block and the list of reference blocks).

Example supplemental predictor prefetch circuitry disclosed herein speculatively prefetches supplemental predictor candidates to populate one or more caches with reference block data that may be fetched by a motion search circuitry in a video encoder. The example supplemental predictor prefetch circuitry sends cache line requests to a memory corresponding to supplemental predictor candidates. In some examples, the supplemental predictor candidates are spatial predictors that are neighbor candidates not prefetched by the predictor prefetch circuitry. In some examples, the supplemental predictor candidates are excess predictor candidates that are not used for motion search.

In some examples, the predictor prefetch circuitry fetches into a cache a group of reference blocks corresponding to a group of predictors representing the top P number of predictors for a next reference block search. The next reference block search means that a motion search circuitry performs a next motion search of P reference blocks in comparison to a source block. In some examples, the next reference block search can commence after the block search circuitry has determined the previous reference block winner. The example block search circuitry analyzes reference blocks that have been loaded into a set of reference block search slots in a local buffer (e.g., the local buffer local to or inside the motion search circuitry). In some examples, the block search circuitry uses the set of reference block search slots to perform the search for the best reference block match. Therefore, the cache line requests to fill the reference block search slots with reference block data are not fetched from memory for a next reference block search until the block search circuitry has completed the determination of a winner (e.g., the reference block winner) of the previous reference block search.

While example fetch circuitry does not perform the memory fetches until a previous reference block winner has been determined, the predictor prefetch circuitry can perform the prefetches corresponding to the next memory fetches and a next set of predictor candidates may have already arrived at the motion search circuitry prior to the determination of the previous reference block winner. In some examples, the predictor prefetch circuitry performs a set of prefetches corresponding to the highest priority predictor candidates from the next set before the determination of the previous reference block winner. In doing so, when fetch circuitry eventually sends the memory fetches for the next reference block search, the cache lines correspond to the fetches may already be populated in a cache.

In some examples, even though the predictor prefetch circuitry may prefetch enough cache lines to fill the reference block search slots for the next reference block search, the supplemental predictor prefetch circuitry may perform an additional number of supplemental prefetches to further fill the cache with additional reference block data. But, because motion is likely to be predictable over several frames, the supplemental predictor prefetch circuitry speculatively prefetches one or more reference blocks corresponding to one or more predictor candidates not used by the predictor prefetch circuitry to fill the cache with likely high priority predictor candidate data for future blocks of current frame. If the speculation is at least partially correct, then one or more predictor candidates prefetched by the predictor prefetch circuitry for a future search will already be in the cache due to the supplemental predictor prefetches. In some examples, the predictor prefetch circuitry fills the cache with data from a number of predictor candidates that are capable of being operated on by the motion search circuitry. For example, the motion search circuitry may have eight slots within a local buffer to load with data from eight reference blocks. Thus, only eight reference blocks will be prefetched by the predictor prefetch circuitry. In this example, the remaining number of predictor candidates beyond the eight that will be used to fill the number of motion search slots available will be sent to the supplemental predictor prefetch circuitry.

FIG. 1 is an illustration of an example compute node 100 to implement predictor prefetching for video encoding. In the illustrated example of FIG. 1, the compute node 100 may be a desktop computer, a laptop computer, another mobile device such as a tablet or a cellular phone, an embedded computer in another device such as an appliance, vehicle, or robot, a router or network switch, a smart controller, a workstation computer, a server computer, a set-top box computing device, or any other type of computing device capable of performing one or more of the functions described in greater detail below.

The example compute node 100 includes processing circuitry 102. In some examples, the processing circuitry 102 may be a central processing unit (CPU), an application specific integrated circuit (ASIC), a field programmable gate array (FPGA), or any other type of processing circuitry capable of executing instructions.

The example compute node 100 includes memory 104. In some examples, the memory 104 may be a buffer, a cache, a dynamic random access memory (DRAM), a static random access memory (SRAM), a non-volatile memory, a mass storage device, or any other type of memory capable of storing data.

The example compute node 100 includes a display controller circuitry 106. In some examples, the display controller circuitry 106 may receive information from other blocks/circuitries within the compute node 100 and send the information using an understandable display protocol (e.g., high-definition multimedia interface (HDMI), or another display protocol) to a display 110 to visually display information, such as videos, icons, and images.

The example compute node 100 includes an interface 108 to communicatively couple one or more blocks/circuitries in the compute node 100. For example, the interface may communicatively couple the processing circuitry 102 to the memory 104 and to the display controller circuitry 106. In some examples, the interface 108 may include a single protocol that is universally utilized between each of the blocks/circuitries coupled. In some examples, the interface 108 includes multiple sub-interfaces that communicatively couple portions of the compute node 100 blocks/circuitries together and the sub-interfaces are tied together with input/output (I/O) control circuitry capable of translating/transferring data between the multiple sub-systems.

The example processing circuitry 102 includes at least one L1/L2 (Level 1/Level 2) cache circuitry 114. In some examples, the L1/L2 cache circuitry 114 receives memory fetches (e.g., cache line requests), directed to storage locations in the memory 104, from the video encoder circuitry 112 and/or from a processor core, a controller, or one or more other circuitries within the processing circuitry 102. The example L1/L2 cache circuitry 114 stores data returned from the memory 104 in one or more cache line storage locations for use by the processing circuitry 102. In some examples, the L1/L2 cache circuitry 114 represents more than one level of cache in a cache hierarchy (e.g., an L1 and an L2 cache, or an L1, an L2, and an L3 cache, among other cache hierarchies). A cache line request means a memory request to retrieve a cache line worth of data. The cache line request includes an address to the memory location from which the cache line worth of data is retrieved. In some examples, each reference block of data is multiple cache lines of data.

The example processing circuitry 102 includes video encoder circuitry 112. In some examples, the video encoder circuitry 112 includes hardware logic to encode raw video stream information (e.g., raw pixel data in a series of frames of video) into a compressed bitstream in an encoding protocol. For example, reference data/source data 116 (e.g., the raw pixel data) may be stored in the memory 104 and the video encoder circuitry 112 encodes the reference data/source data 116 into a compressed bitstream 118 in a video format, such as in the Moving Picture Experts Group (MPEG) 4 (e.g., MP4) standard protocol. In some examples, the video encoder circuitry 112 may encode the reference data/source data 116 into any other known protocol. In some examples, the video encoder circuitry 112 stores the compressed bitstream 118 back into the memory 104. In some examples, the video encoder circuitry 112 provides the compressed bitstream 118 to network controller/radio frequency (RF) transceiver 122 over the interface 108. In some examples, the network controller/radio frequency (RF) transceiver 122 streams (e.g., in a wireless or wired manner) over a network/cloud 124 to one or more destinations remote from compute node 100. The video encoder circuitry 112 is described in greater detail below in regard to FIG. 2.

The example video encoder circuitry 102 includes a motion search circuitry 120. In some examples, the motion search circuitry 120 searches for a source block in a current frame of a video and one or more reference blocks in a previous frame of a video. The example motion search circuitry 120 is described in greater detail below in regard to FIG. 3.

Figure 2:
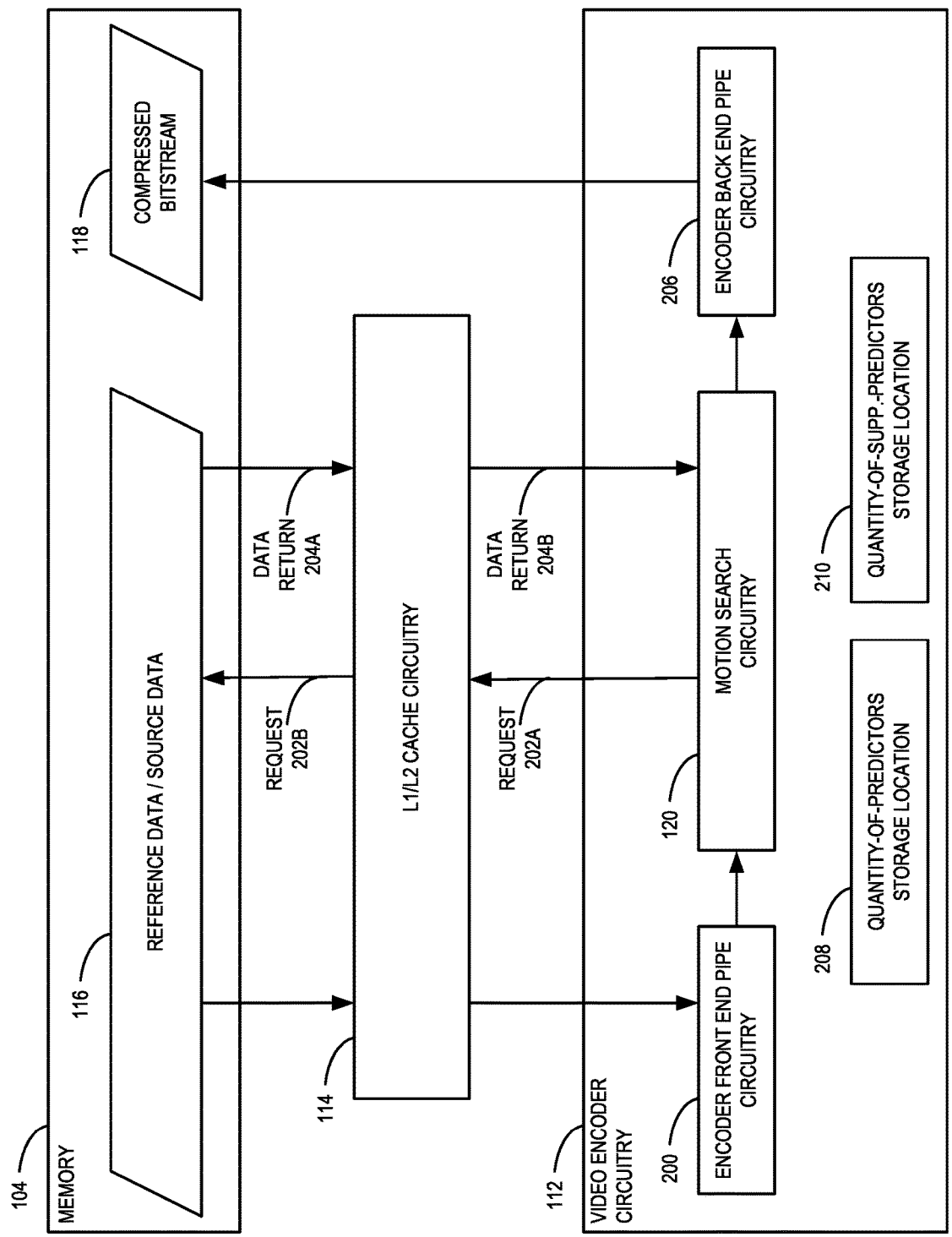
FIG. 2 is a block diagram of example video encoder circuitry within the compute node of FIG. 1.

FIG. 2 is a block diagram of an example video encoder circuitry 112 within the compute node of FIG. 1 to implement predictor prefetching for video encoding. The video encoder circuitry 112 of FIG. 2 may be instantiated (e.g., creating an instance of, bring into being for any length of time, materialize, implement, etc.) by processor circuitry such as a central processing unit executing instructions. Additionally or alternatively, the video encoder circuitry 112 of FIG. 2 may be instantiated (e.g., creating an instance of, bring into being for any length of time, materialize, implement, etc.) by an ASIC or an FPGA structured to perform operations corresponding to the instructions. It should be understood that some or all of the circuitry of FIG. 2 may, thus, be instantiated at the same or different times. Some or all of the circuitry may be instantiated, for example, in one or more threads executing concurrently on hardware and/or in series on hardware. Moreover, in some examples, some or all of the circuitry of FIG. 2 may be implemented by one or more virtual machines and/or containers executing on the microprocessor.

In the illustrated example of FIG. 2, the video encoder circuitry 112 includes three major blocks that make up a video encoding pipe and perform functions associated with everything needed to encode reference data/source data 116 (e.g., stored in the memory 104) into a compressed bitstream 118 (e.g., stored in the memory during the video encoding. The three major blocks include an encoder front end pipe circuitry 200, a motion search circuitry 120, and an encoder back end pipe circuitry 206.

The example encoder front end pipe circuitry 200 processes the raw pixel data (e.g., the reference data/source data 116) into a series of frames (e.g., the frames of a video that are equal in size to the resolution of the video and occurring at whatever frame rate in which the video was recorded). For example, a common resolution for the frame of a video may include a pixel resolution of 1024 pixels in the X direction and 768 pixels in the Y direction, which make up a single frame of video. Other example resolutions include 640×480 pixels, 2560×1440 pixels (e.g., 2 k resolution), 3840×2160 pixels (e.g., 4 k resolution), 7680×4320 pixels (e.g., 8 k resolution), among others. Furthermore, the number of frames that are to be displayed in one second of viewing would be considered the frame rate. Common example frame rates include 24 frame per second (FPS), 30 FPS, 60 FPS, 120 FPS, and 240 FPS, among others.

In some examples, the encoder front end pipe circuitry 200 determines the resolution and frame rate of the reference data/source data 116 and performs intake processing of the frames dynamically as the video encoder circuitry 112 encodes the video. Video encoding utilizes a number of compression techniques to make the video less data intense for storage on a per-frame basis, thus the output of the video encoder circuitry 112 is deemed a compressed bitstream 118 because for each second of video, the compressed bitstream 118 likely takes significantly less data storage space than the reference data/source data 116. For example, if a video has zero movement between frames for two seconds, the compressed bitstream 118 likely will have a single frame of the content at the start of the two seconds and instructions that tell a video decoder to use the same frame for the next 60 frames (in the case of a two second still shot at 30 FPS. This potentially could provide a data storage savings of over 98% (e.g., one frame worth of pixel data for two seconds of video vs. 60 frames worth of pixel data for two seconds of video).

In some examples, the encoder front end pipe circuitry 200 tracks each source frame (e.g., a current frame of video being encoded) and a reference frame (e.g., the previous frame of video that was encoded). The example source and reference frames are utilized by the motion search circuitry 120 to detect motion between frames. In some examples, the encoder front end pipe circuitry 200 additionally performs one or more other video encoding pipeline tasks that happen prior to motion searching. For example, the encoder front end pipe circuitry 200 may provide the motion search circuitry 120 with one or more of the predictor candidates for motion estimation, such as temporal predictor candidates that predict no motion between blocks in the reference frame and blocks in the source frame.

The example video encoder circuitry 112 includes the motion search circuitry 120 that performs a search for motion between the content that is in a source block from the source frame and the content that is in one or more reference blocks from the reference frame. In some examples, the motion search circuitry 120 sends cache line requests to the memory 104 to retrieve reference data/source data 116 of portions of the reference frame and the source frame. In some examples, the motion search circuitry 120 sends a cache line requests (e.g., request 202A may refer to multiple cache lines, and potentially consecutive cache lines) to memory 104. The request 202A arrives at the L1/L2 cache circuitry 114, which then forwards the request (request 202B) on to the memory 104. Once the reference data/source data 116 requested is retrieved from one or more memory locations in the memory 104, the memory 104 sends/returns the data (data return 204A) to the requestor (motion search circuitry 120). The data return 204A initially arrives at the L1/L2 cache circuitry 114, which stores the data then forwards a copy of the data to the motion search circuitry 120 (data return 204B). In some examples, the motion search circuitry 120 is not ready for the data, but a copy is now stored in the L1/L2 cache circuitry 114 for localized quick access. The example motion search circuitry 120 is described in greater detail below in regard to FIG. 3.

The example video encoder circuitry 112 also includes the encoder back end pipe circuitry 206. In some examples, the encoder back end pipe circuitry 206 performs one or more additional compression techniques beyond motion search. In some examples, the encoder back end pipe circuitry 206 wraps the newly encoded compressed bitstream 118 into the file format of the video compression standard protocol utilized and stores the compressed bitstream 118 in the memory 104 as one or more files of protocol type (e.g., *.mp4). In some examples, the encoder back end pipe circuitry 206 includes one or more additional functions as needed for a given compression protocol.

In some examples, the video encoder circuitry 112 additionally includes one or more storage locations (e.g., registers, buffers, pointers to memory 104 storage locations, etc.) to store programmable values that can provide customizability of one or more of the video encoder circuitry 112 functionalities. For example, the video encoder circuitry 112 may include a quantity-of-predictors storage location 208 to store a quantity-of-predictors value and/or a quantity-of-supplemental-predictors storage location 210 to store a quantity-of-supplemental-predictors value, among other storage locations. The quantity-of-predictors value and the quantity-of-supplemental-predictors value are described in greater detail below in regard to FIG. 3.

Figure 3:
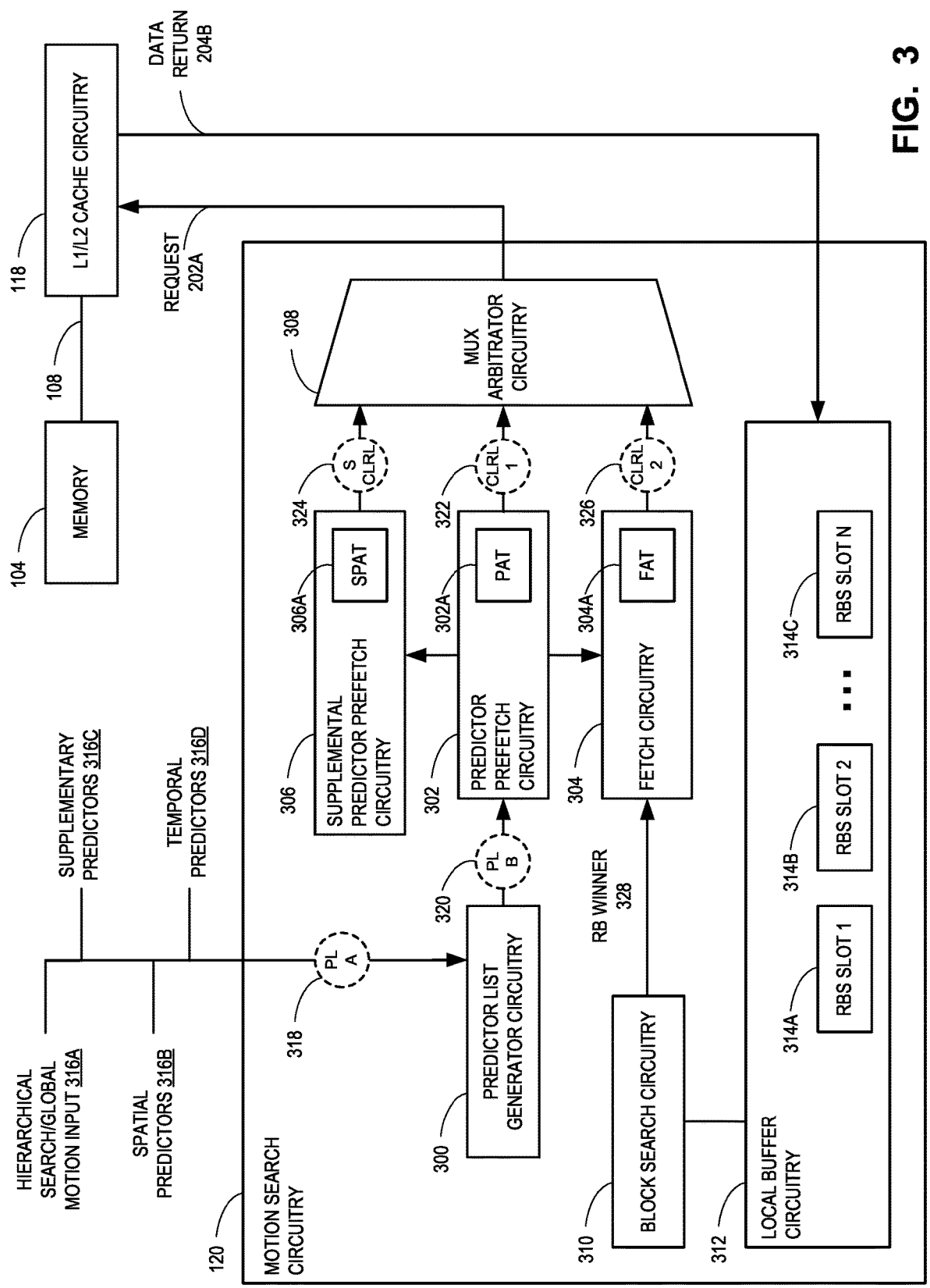
FIG. 3 is a block diagram of example motion search circuitry that performs predictor prefetching for video encoding.

FIG. 3 is a block diagram of an example motion search circuitry that performs predictor prefetching for video encoding. In some examples, the motion search circuitry 120 searches for motion between the pixel content in a source block from a current source frame and pixel content in a reference block from a reference frame.

The motion search circuitry 120 of FIG. 3 may be instantiated (e.g., creating an instance of, bring into being for any length of time, materialize, implement, etc.) by processor circuitry such as a central processing unit executing instructions. Additionally or alternatively, the motion search circuitry 120 of FIG. 3 may be instantiated (e.g., creating an instance of, bring into being for any length of time, materialize, implement, etc.) by an ASIC or an FPGA structured to perform operations corresponding to the instructions. It should be understood that some or all of the circuitry of FIG. 3 may, thus, be instantiated at the same or different times. Some or all of the circuitry may be instantiated, for example, in one or more threads executing concurrently on hardware and/or in series on hardware. Moreover, in some examples, some or all of the circuitry of FIG. 3 may be implemented by one or more virtual machines and/or containers executing on the microprocessor.

In the illustrated example of FIG. 3, the motion search circuitry 120 includes predictor list generator circuitry 300, predictor prefetch circuitry 302, fetch circuitry 304, supplemental predictor prefetch circuitry 306, multiplexer (mux) arbitrator circuitry 308, block search circuitry 310, and local buffer circuitry 312. In some examples, the motion search circuitry 120 is part of a macroblock (MB) processing unit utilizing an Advanced Video Coding (AVC) compression standard or part of a largest coding unit (LCU) processing unit utilizing a High Efficiency Video Coding (HEVC) compression standard. In some examples, a MB or LCU includes circuitry to perform functions on a block (e.g., grid) of pixels (e.g., samples) such as a 16×16 block of pixels. For example, the MB or LCU circuitry may include a series of functions to perform on the block of pixels, such as linear transform, prediction, and motion compensation, among other functions. In some examples, the MB or LCU circuitry, including the motion search circuitry 120, can operate on a single motion vector (e.g., predictor) for an entire MB or LCU. In some examples, the block of pixels can get divided into partitions, and functions such as motion search, may be performed on individual partitions such as an 8×8 block of pixels or a 4×4 block of pixels.

Turning to FIG. 3, the example motion search circuitry 120 includes a predictor list generator circuitry 300. The example predictor list generator circuitry 300 obtains a predictor list including a plurality of predictor candidates. For example, predictor list A 318 (PL A) is obtained from a combination of predictor candidates that may be fed in from external sources, such as other circuitry from within the video encoder 112 (FIGS. 1 and 2) and/or other circuitry external to the video encoder 112. In some examples, the predictor list A 318 represents several individual predictor candidates that are obtained from predictor sources rather than being received as one combined list. As described herein, a predictor describes a motion vector that predicts a type of motion. A predictor may be referred to in general, which is a motion vector, or the predictor may be referred to in relationship to a specific type of predictor, which specifies the type of motion being predicted (e.g., a spatial predictor, a temporal predictor, etc.). As described herein, a predictor candidate is a single example of a predictor. For example, there is a spatial predictor type and in a certain instance during video encoding there may be three spatial predictor candidates to use for motion search.

The example predictor list generator circuitry 300 may receive predictors of several types such as a hierarchical search using global motion input predictors 316A, spatial predictors 316B, supplementary predictors 316C, temporal predictors 316D, among other possible predictor types.

In some examples, a hierarchical motion search predictor candidate 316A is generated by implementing an integer search on larger regions of a reference frame (e.g., previous frame) and then using a fractional refinement of the best integer search result. The example hierarchical motion search predictor may be downscaled multiple times, each time being by a factor of the original image. The global motion input searches for global motion of the frame (or large regions of the frame) to predict motion from the source block to a reference block.

In some examples, a spatial predictor candidate 316B is a neighbor candidate, such as one or more closest reference blocks in distance from the current source block. For example, an upper left corner of the source block may be located at [X, Y] position in the source frame. A spatial predictor (nearest neighbor) candidate 316B to the source block may be a reference block with an upper left corner located at [X±1, Y±1]. In some examples, there may be another minimum delta of pixels in the X and/or Y direction greater than one to be searched, such as at [X±2, Y±2], or other optional minimum deltas.

In some examples, a supplementary predictor candidate 316C may include one or more other types of predictor candidates. For example, a supplementary predictor candidate 316C may include a stream-in predictor candidate. A stream-in predictor candidate is derived from a request from an application. In some examples, an application or driver indicates a region of interest for the motion search to focus on. The example stream-in predictor candidate may be based on knowledge outside of the scope of the motion search circuitry 120 and, therefore, the application or driver utilizes stream-in predictor candidate to inform the motion search circuitry 120 to look for motion in areas of the reference frame that may not have otherwise been high priority predictor candidates. In some examples, one or more other types of supplementary predictor candidates 316C may be provided to the predictor list generator circuitry 300.

In some examples, temporal predictors 316D designate the exact same block of the reference frame to the source frame. Thus, temporal predictors 316D assume no movement between frames.

In the illustrated example of FIG. 2, the predictor candidates of the predictor types 316A-316D are obtained by the predictor list generator circuitry 300 as an unsorted and un-pared (e.g., no predictor candidates are removed) predictor list A 318. In some examples, the predictor list generator circuitry 300 sorts the predictor candidates in the predictor list A 318 in a priority order. The priority order may be based on any number of logical priority order rules implemented in the predictor list generator circuitry 300. In some examples, predictor types may be associated with levels of importance, and sorted accordingly. For example, supplementary predictors 316C may have a higher priority than spatial predictors 316B, and as a result, any supplementary predictor candidates 316C are sorted above the spatial predictor candidates 316B in the predictor list A 318. In some examples, there may be logical priority order rules to sort predictor candidates of the same type as well. For example, spatial predictor candidates may be sorted based on how close each is to the source block, with the closer spatial predictor candidates sorted at a higher priority than any further spatial predictor candidates.

The example predictor list generator circuitry 300 then checks for redundant predictor candidates and removes any so as to only have one predictor candidate corresponding to a specific motion vector. Redundant predictor candidates can appear within a predictor type as well as across predictor types because a predictor candidate is simply a motion vector. For example, a supplementary predictor candidate may have a motion vector that is the same motion vector as a spatial predictor candidate, thus, two motion vectors of the same value would be in the predictor list A 318. In some examples, the predictor list generator circuitry 300 provides the sorted and non-redundant list of predictor candidates (predictor list B 320) to the predictor prefetch circuitry 302.

Figure 6:
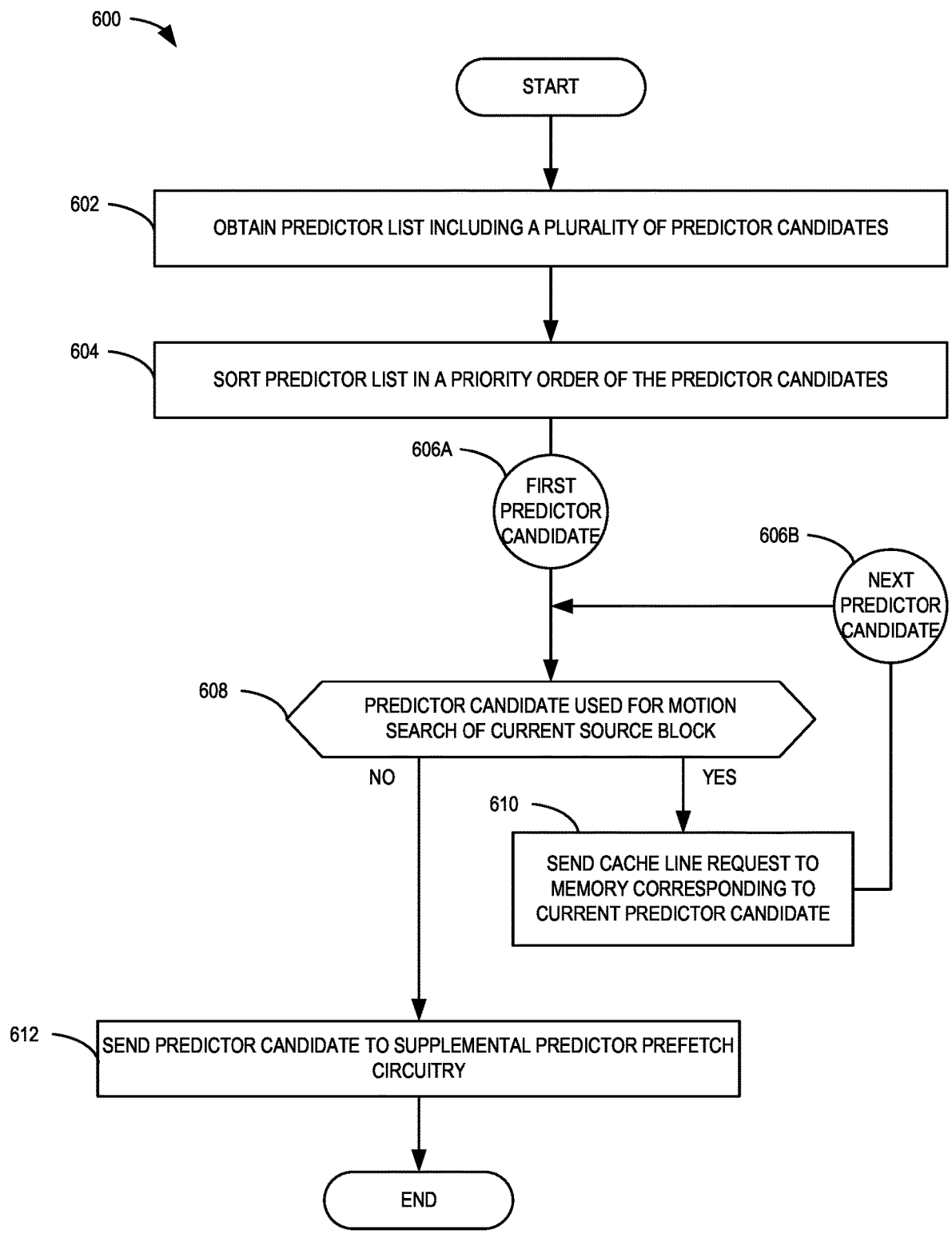
FIG. 6 is a flowchart representative of example machine readable instructions and/or example operations that may be executed by example processor circuitry to implement a portion of the motion search circuitry of FIG. 3.

In some examples, the predictor list generator circuitry 300 is instantiated by processor circuitry executing predictor list generator instructions and/or configured to perform operations such as those represented by the flowchart of FIG. 6.

In some examples, the apparatus includes means obtaining a predictor list of predictor candidates. For example, the means for obtaining may be implemented by predictor list generator circuitry 300. In some examples, the predictor list generator circuitry 300 may be instantiated by processor circuitry such as the example processor circuitry 912 of FIG.

9. For instance, the predictor list generator circuitry 300 may be instantiated by the example microprocessor 1000 of FIG. 10 executing machine executable instructions such as those implemented by at least blocks 602 and 604 of FIG. 6. In some examples, the predictor list generator circuitry 300 may be instantiated by hardware logic circuitry, which may be implemented by an ASIC, XPU, or the FPGA circuitry 1100 of FIG. 11 structured to perform operations corresponding to the machine readable instructions. Additionally or alternatively, the predictor list generator circuitry 300 may be instantiated by any other combination of hardware, software, and/or firmware. For example, the predictor list generator circuitry 300 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the means for obtaining includes means for sorting the predictor list in a priority order of the predictor candidates. In some examples, the means for obtaining includes means for removing redundant predictor candidates from the predictor list.

In the illustrated example of FIG. 3, the motion search circuitry 120 includes predictor prefetch circuitry 302. Upon obtaining the predictor list B 320, the example predictor prefetch circuitry 302 sends cache line requests to the memory 104 (FIGS. 1 and 2) that correspond to some or all of the predictor candidates in the predictor list B 320. For example, cache line request list (CLRL) 1 (322) is a list of cache line requests. In some examples, the predictor prefetch circuitry 302 includes a predictor address translator (PAT) 302A. In some examples, the PAT 302A translates predictor candidates (e.g., motion vectors) from the obtained predictor list B 320 to memory addresses (e.g., cache lines). In some examples, the predictor prefetch circuitry 302 sends the translated cache line requests, as the CLRL 1 (322), to the memory 104.

In some examples, the predictor prefetch circuitry 302 sends a quantity of cache line requests to the memory 104 that is equal to a quantity-of-predictors value. In some examples, the quantity-of-predictors value is stored in the quantity-of-predictors storage location 208 (FIG. 2). For example, the predictor prefetch circuitry 302 obtains the predictor list B 320 and there are eight predictor candidates in the predictor list B 320. The predictor prefetch circuitry 302 then may determine that the quantity-of-predictors value stored in the quantity-of-predictors storage location 208 is four.

In some examples, the predictor prefetch circuitry 302 sends cache line requests to the memory 104 in CLRL 1 (322). Since the predictor candidates in the predictor list B 320 have already been sorted in a priority order (e.g., by predictor list generator circuitry 300), the example predictor prefetch circuitry 302 sends cache line requests corresponding to the first four predictor candidates (e.g., top four priority predictor candidates) from the predictor list B 320. For example, the predictor prefetch circuitry 302 can walk through the predictor list B 320, starting from the first predictor candidate with the highest priority, and work down through the list (e.g., starting with a predictor candidate A with priority 1). The example predictor prefetch circuitry 302 causes the PAT 302A to translate each predictor candidate into a corresponding cache line address. In some examples, the predictor prefetch circuitry 302

The example predictor prefetch circuitry 302 sends the cache line requests in CLRL 1 (322) to the memory 104 at a first time (T1). For example, as soon as the predictor prefetch circuitry 302 obtains the predictor list B 320, the PAT 302A may translate the predictor candidates in the predictor list B into memory addresses (e.g., cache line addresses). Upon completion of the translations, the predictor prefetch circuitry 302 immediately (or in very short order) sends the translated cache line addresses as cache line requests (e.g., in CLRL 1 (322) to the memory 104. In some examples, the timing of when the predictor prefetch circuitry 302 sends the cache line requests in the CLRL 1 (322) to the memory 104 is before a reference block winner of the "previous block" has been determined by a block search circuitry 310 in the motion search circuitry 120. In some examples, the previous block means a grid of pixels designated for motion search by an LCU/MB. In some examples, there are a plurality of previous blocks that are included in a single frame of video, each of which has an LCU/MB motion search performed.

In some examples, the predictor prefetch circuitry 302 sends a copy of the predictor list B 320 to fetch circuitry 304. In some examples, predictor prefetch circuitry 302 sends a copy of the cache line requests in CLRL 1 (322) to the fetch circuitry 304. In yet other examples, the predictor list generator circuitry 300 sends the predictor list B 320 directly to the fetch circuitry 304.

In some examples, the predictor prefetch circuitry 302 sends some of the predictor candidates in the predictor list B 320 to supplemental predictor prefetch circuitry 306. For example, as described above, the predictor prefetch circuitry 302 may walk through the predictor list B 320 and send a cache line request corresponding to each predictor candidate that is used for motion search of the current source block. In some examples, the predictor prefetch circuitry 302 stops sending cache lines to memory once all cache lines corresponding to predictor candidates used for motion search of the current source block have been sent Once the example predictor prefetch circuitry 302 reaches a first predictor candidate in the predictor list B 320 that is not used for motion search of the current source block, the predictor prefetch circuitry 302 may send the remaining predictor candidates in the predictor list B 320 to the supplemental predictor prefetch circuitry 306

In some examples, the predictor prefetch circuitry 302 sends predictor candidates of specific predictor types to the supplemental predictor prefetch circuitry 306. For example, the supplemental predictor prefetch circuitry 306 may only prefetch spatial predictors 316B due to a tendency for nearest neighbor reference block searches to be performed in a relatively sequential order as the video encoder circuitry 112 moves through a series of MBs/LCUs in a reference frame.

In some examples, the predictor prefetch circuitry 302 sends cache line addresses/requests (corresponding predictor candidates) to the supplemental predictor prefetch circuitry 306 because the PAT 302A has already translated predictor candidates beyond the set/group in CLRL 1 (322).

In some examples, the predictor prefetch circuitry 302 sends the entire predictor list B 320 to the supplemental predictor prefetch circuitry 306. In some examples, the predictor list generator circuitry 300 sends the predictor list B 320 directly to the supplemental predictor prefetch circuitry 306. In examples that include the supplemental predictor prefetch circuitry 306 obtaining the entire predictor list B 320, the supplemental predictor prefetch circuitry 306 may utilize both the quantity-of-predictors value and the quantity-of-supplemental-predictors value to determine which predictor candidates in the predictor list B 320 to send as corresponding cache line requests to the memory 104.

In some examples, the predictor prefetch circuitry 302 is instantiated by processor circuitry executing predictor prefetch instructions and/or configured to perform operations such as those represented by the flowchart of FIG. 6.

In some examples, the apparatus includes means for sending first cache line requests to a memory corresponding to predictor candidates. For example, the means for sending first cache line requests may be implemented by predictor prefetch circuitry 302. In some examples, the predictor prefetch circuitry 302 may be instantiated by processor circuitry such as the example processor circuitry 912 of FIG. 9. For instance, the predictor prefetch circuitry 302 may be instantiated by the example microprocessor 1000 of FIG. 10 executing machine executable instructions such as those implemented by at least blocks 608, 610, and 612 of FIG. 6. In some examples, the predictor prefetch circuitry 302 may be instantiated by hardware logic circuitry, which may be implemented by an ASIC, XPU, or the FPGA circuitry 1100 of FIG. 11 structured to perform operations corresponding to the machine readable instructions. Additionally or alternatively, the predictor prefetch circuitry 302 may be instantiated by any other combination of hardware, software, and/or firmware. For example, the predictor prefetch circuitry 302 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the means for sending first cache line requests includes means for determining whether a predictor candidate is used for motion search for the current source block. In some examples, the means for sending first cache line requests includes means for sending predictor candidates that are not used for motion search for the current source block to a supplemental predictor prefetch circuitry 306.

In the illustrated example of FIG. 3, the motion search circuitry 120 includes supplemental predictor prefetch circuitry 306. The example supplemental predictor prefetch circuitry 306 obtains either a subset of predictor candidates from the predictor list B 320, or obtains the cache line addresses corresponding to the subset of predictor candidates from the predictor list B 320, or obtains the entire predictor list B 320.

In some examples, if the supplemental predictor prefetch circuitry 306 obtains the subset of predictor candidates (e.g., from the predictor prefetch circuitry 302), then the supplemental predictor prefetch circuitry 306 may cause the SPAT 306A to translate the subset of predictor candidates into corresponding cache line addresses. The example SPAT 306A may translate each of the predictor candidates in such a subset of predictor candidates.

In some examples, if the supplemental predictor prefetch circuitry 306 obtains the cache line addresses corresponding to the subset of predictor candidates from the predictor list B 320, then the supplemental predictor prefetch circuitry 306 may forward such cache line addresses as cache line requests to the memory 104.

Figure 4:
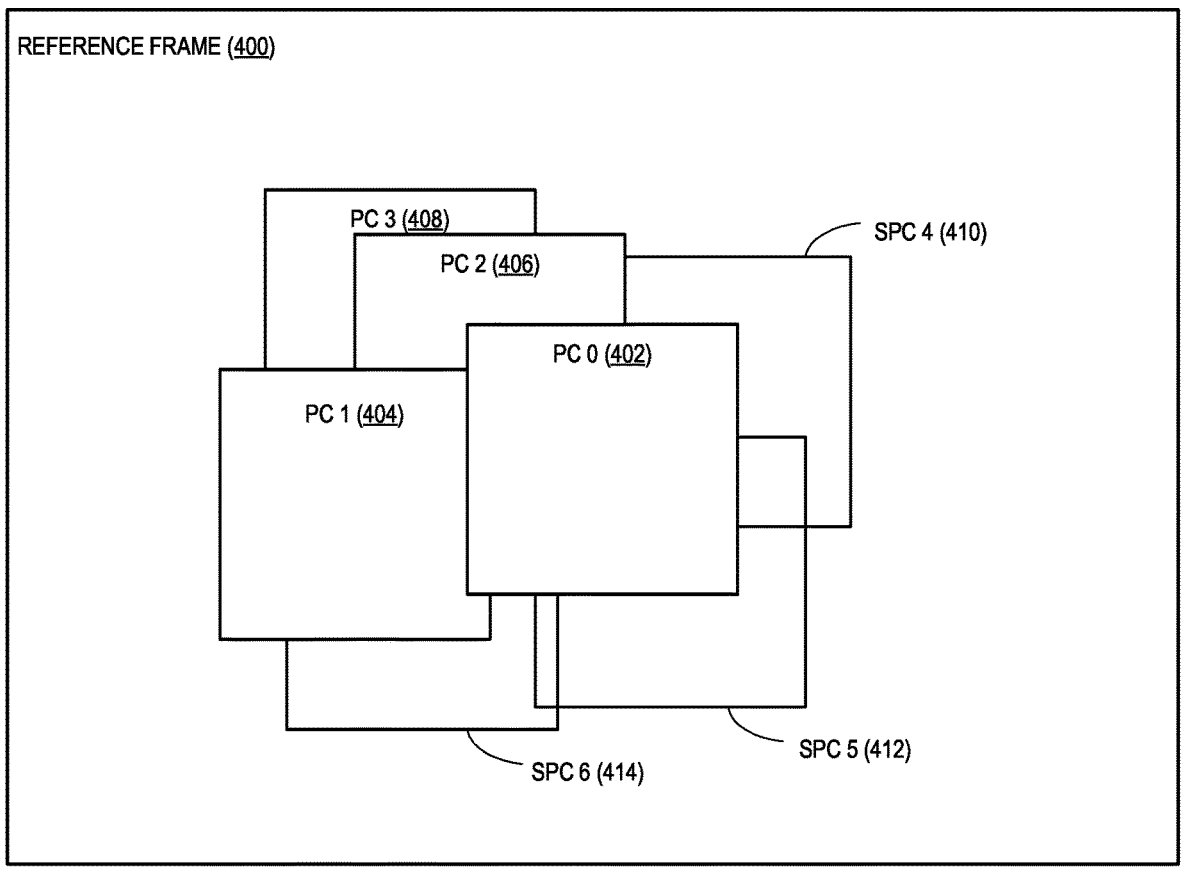
FIG. 4 is an illustration of an example of reference blocks from a reference frame corresponding to predictor candidates and supplemental predictor candidates.

In some examples, if the supplemental predictor prefetch circuitry 306 obtains the entire predictor list B 320, then the supplemental predictor prefetch circuitry 306 accounts for the predictor candidates from the predictor list B 320 that are to be sent to the memory 104 by the predictor prefetch circuitry 302. To account for such predictor candidates, the example supplemental predictor prefetch circuitry 306 disregards a top P number of predictor candidates from the predictor list B 320 where P is the quantity-of-predictors value. The example supplemental predictor prefetch circuitry 306 then causes the SPAT 306A to translate one or more predictor candidates in the predictor list B 320 starting with a first predictor candidate in the predictor list B 320 that is not used for motion search for the current source block. In some examples, the supplemental predictor prefetch circuitry 306 sends cache line requests corresponding to only certain predictor types, such as spatial predictors 316B and/or temporal predictors 316D. FIG. 4 is an illustration of an example of reference blocks from a reference frame corresponding to predictor candidates and supplemental predictor candidates. In some examples, a reference frame 400 includes a group of predictor candidates (predictor candidate (PC) 0 (402), PC 1 (404), PC 2 (406), and PC 3 (408)). In some examples, the four predictor candidates are the top four predictor candidates in a priority order for a list of predictor candidates. As illustrated, the predictor candidates correspond to reference blocks in the reference frame 400 that are to be compared to a source block in a source frame. The comparison is to determine which reference block provides the best match for motion of data/objects in the source block and the predictor candidates, represented as motion vectors are searched by the motion search circuitry 120. In some examples, three supplemental predictor candidates (SPC) (e.g., SPC 4 (410), SPC 5 (412), and SPC 6 (414)) represent the next three highest priority predictor candidates after the top four priority predictor candidates. For example, SPC 4 (410), SPC 5 (412), and SPC 6 (414) may be spatial predictor candidates that are neighbors to one or more of the predictor candidates (PC 0 (402) through PC 3 (408)) and/or neighbors to the source block in the source frame.

Figure 7:
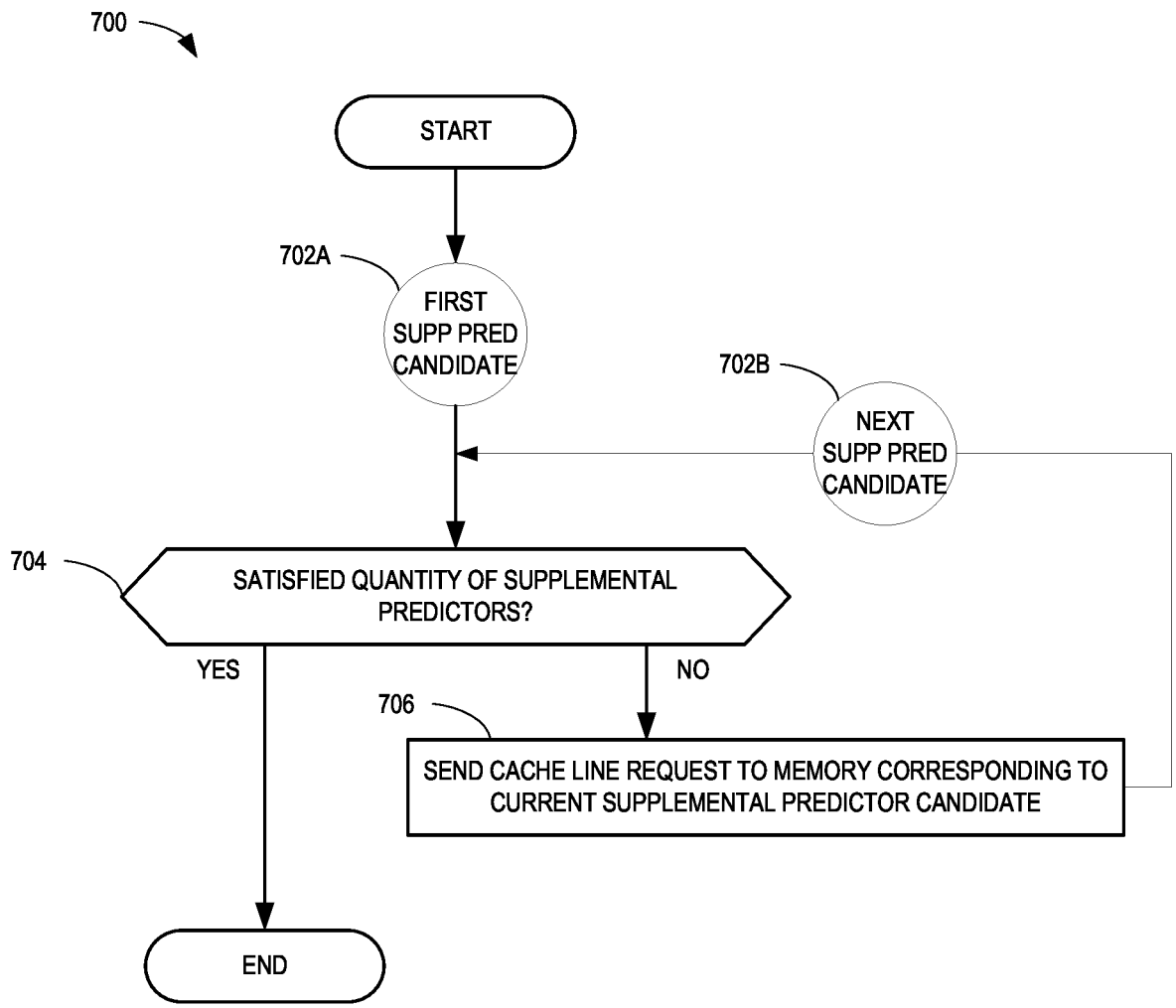
FIG. 7 is a flowchart representative of example machine readable instructions and/or example operations that may be executed by example processor circuitry to implement another portion of the motion search circuitry of FIG. 3.

Returning to FIG. 3, in some examples, the supplemental predictor prefetch circuitry 306 is instantiated by processor circuitry executing supplemental predictor prefetch instructions and/or configured to perform operations such as those represented by the flowchart of FIG. 7.

In some examples, the apparatus includes means for sending second cache line requests to a memory corresponding to supplemental predictor candidates. For example, the means for sending second cache line requests may be implemented by supplemental predictor prefetch circuitry 306. In some examples, the supplemental predictor prefetch circuitry 306 may be instantiated by processor circuitry such as the example processor circuitry 912 of FIG. 9. For instance, the supplemental predictor prefetch circuitry 306 may be instantiated by the example microprocessor 1000 of FIG. 10 executing machine executable instructions such as those implemented by at least blocks 704 and 706 of FIG. 7. In some examples, the supplemental predictor prefetch circuitry 306 may be instantiated by hardware logic circuitry, which may be implemented by an ASIC, XPU, or the FPGA circuitry 1100 of FIG. 11 structured to perform operations corresponding to the machine readable instructions. Additionally or alternatively, the supplemental predictor prefetch circuitry 306 may be instantiated by any other combination of hardware, software, and/or firmware. For example, the supplemental predictor prefetch circuitry 306 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In the illustrated example of FIG. 3, the motion search circuitry 120 includes fetch circuitry 304. The example fetch circuitry 304 includes fetch address translator (FAT) 304A that translates predictor candidates (e.g., motion vectors) into cache line addresses/requests.

In some examples, the fetch circuitry 304 obtains a subset (e.g., subgroup) of predictor candidates in the predictor list B 320 from the predictor prefetch circuitry 302. In some examples, the obtained subset of predictor candidates are the same as the predictor candidates corresponding to the cache line requests in CLRL 1 (322). In some examples, the fetch circuitry 304 sends the cache line requests to the memory 104 corresponding to the obtained subset of predictor candidates as cache line request list (CLRL) 2 (326). In some examples, the fetch circuitry 304 sends CLRL 2 (326) to the memory at a specific time (T2). For example, the fetch circuitry 304 may send the cache line requests in the CLRL 2 (326) to the memory 104 in response to (e.g., when) a reference block winner of the previous block has been determined by the block search circuitry 310 in the motion search circuitry 120. Thus, in some examples, the cache line requests in CLRL 1 (322) may arrive at the memory 104 before the cache line requests in CLRL 2 (326) because, unlike the fetch circuitry 304, the predictor prefetch circuitry 302 does not wait for a reference block winner of a previous block to send the cache line requests in CLRL 1 (322).

In some examples, the fetch circuitry 304 obtains the predictor list B 320 directly from the predictor list generator circuitry 300. In such examples, the fetch circuitry causes the FAT 304A to translate a P number of top predictor candidates from the predictor list B 320 into cache line addresses/requests. In some examples, P is the quantity-of-predictors value in the quantity-of-predictors storage location 208. In some examples, P is a quantity of reference block searches that can be performed simultaneously by block search circuitry 310 in motion search circuitry 120.

The example fetch circuitry 304 does not send the cache line requests in the CLRL 2 (326) to the memory 104 until it receives the reference block winner 328 from the block search circuitry 310. In some examples, receiving/obtaining the reference block winner 328 notification is required prior to the fetch circuitry 304 sending of any cache line requests to the memory 104. In some examples, the reference block winner 328 notification signals the completion of the previous reference block search by the block search circuitry 310. A local buffer circuitry 312 stores reference blocks corresponding to the predictor candidates for the previous reference block search in reference block search (RBS) slots 1-N (314A-314C). Prior to the completion of the previous reference block search, new cache line requests may result in a premature overwriting of data in the RBS slots 1-N (314A-314C). Thus, waiting for the reference block winner 328 notification provides an assurance that the previous reference block search will not be corrupted or interrupted.

Figure 8:
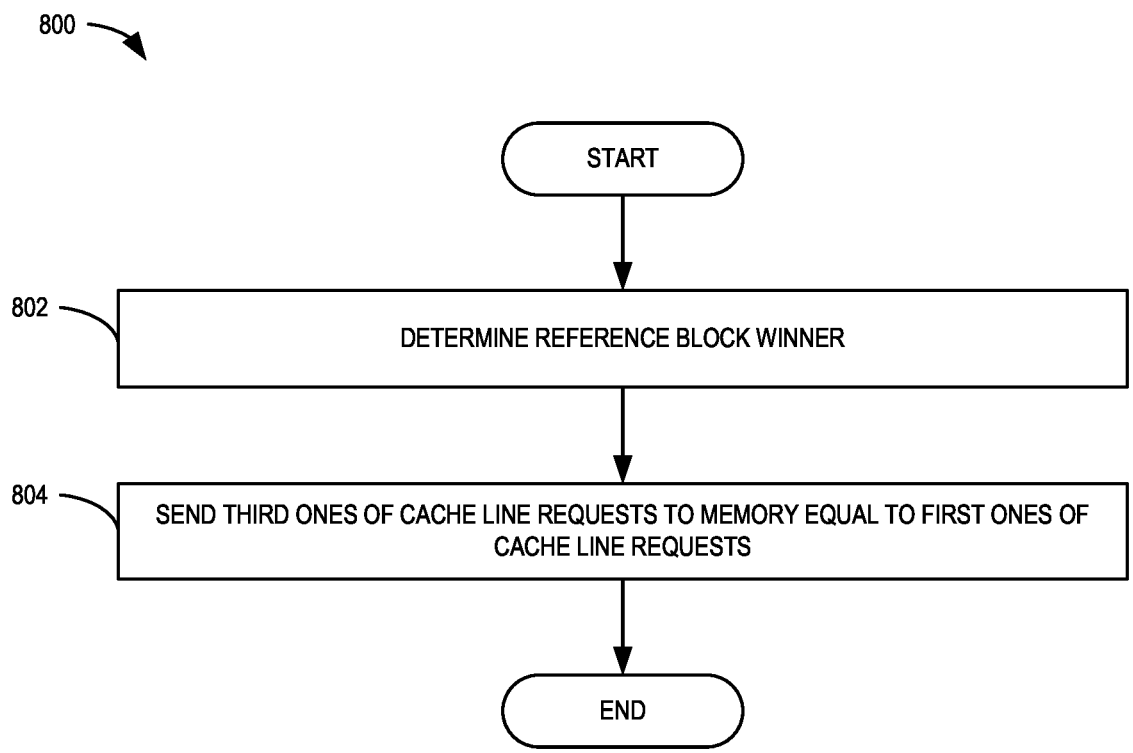
FIG. 8 is a flowchart representative of example machine readable instructions and/or example operations that may be executed by example processor circuitry to implement another portion of the motion search circuitry of FIG. 3.

In some examples, the fetch circuitry 304 is instantiated by processor circuitry executing fetch instructions and/or configured to perform operations such as those represented by the flowchart of FIG. 8.

In some examples, the apparatus includes means sending third cache line requests to a memory corresponding to the first cache line requests in response to a determined reference block winner. For example, the means sending third cache line requests may be implemented by fetch circuitry 304. In some examples, the fetch circuitry 304 may be instantiated by processor circuitry such as the example processor circuitry 912 of FIG. 9. For instance, the fetch circuitry 304 may be instantiated by the example microprocessor 1000 of FIG. 10 executing machine executable instructions such as those implemented by at least block 804 of FIG. 8. In some examples, the fetch circuitry 304 may be instantiated by hardware logic circuitry, which may be implemented by an ASIC, XPU, or the FPGA circuitry 1100 of FIG. 11 structured to perform operations corresponding to the machine readable instructions. Additionally or alternatively, the fetch circuitry 304 may be instantiated by any other combination of hardware, software, and/or firmware. For example, the fetch circuitry 304 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In the illustrated example of FIG. 3, the motion search circuitry 120 includes block search circuitry 310. The example block search circuitry 310 includes one or more of transform logic, prediction logic, and/or motion vector analysis logic, among other types of logic that provide the ability to search for the best reference block match among a group of reference blocks from a previous video (reference) frame in comparison to a source block in the current video (source) frame. One or more motion search algorithms utilized in AVC, HEVC, and/or in one or more other video encoding standards may be applied in block search circuitry 310.

In some examples, the block search circuitry 310 performs the one or more motion search algorithms using data from reference block(s) and source block(s) stored in the local buffer circuitry 312 as a set of N RBS slots (e.g., RBS slot 1 (314A), RBS slot 2 (314B), through RBS slot N (314C). In some examples, the data from the reference block(s) and source block(s) are retrieved from the memory 104 and from the L1/L2 cache circuitry 118 as data return 204B that returns from one or more cache line requests sent through multiplexer (mux) arbitrator circuitry 308 as request 202A to L1/L2 cache circuitry 118 and to memory 104. The example mux arbitrator circuitry 308 is described in greater detail below.

In some examples, the block search circuitry 310 is instantiated by processor circuitry executing block search instructions and/or configured to perform operations such as those represented by the flowchart of FIG. 8.

In some examples, the apparatus includes means determining a reference block winner from a previous reference frame. For example, the means for determining may be implemented by block search circuitry 310. In some examples, the block search circuitry 310 may be instantiated by processor circuitry such as the example processor circuitry 912 of FIG. 9. For instance, the block search circuitry 310 may be instantiated by the example microprocessor 1000 of FIG. 10 executing machine executable instructions such as those implemented by at least block 802 of FIG. 8.

Figure 11:
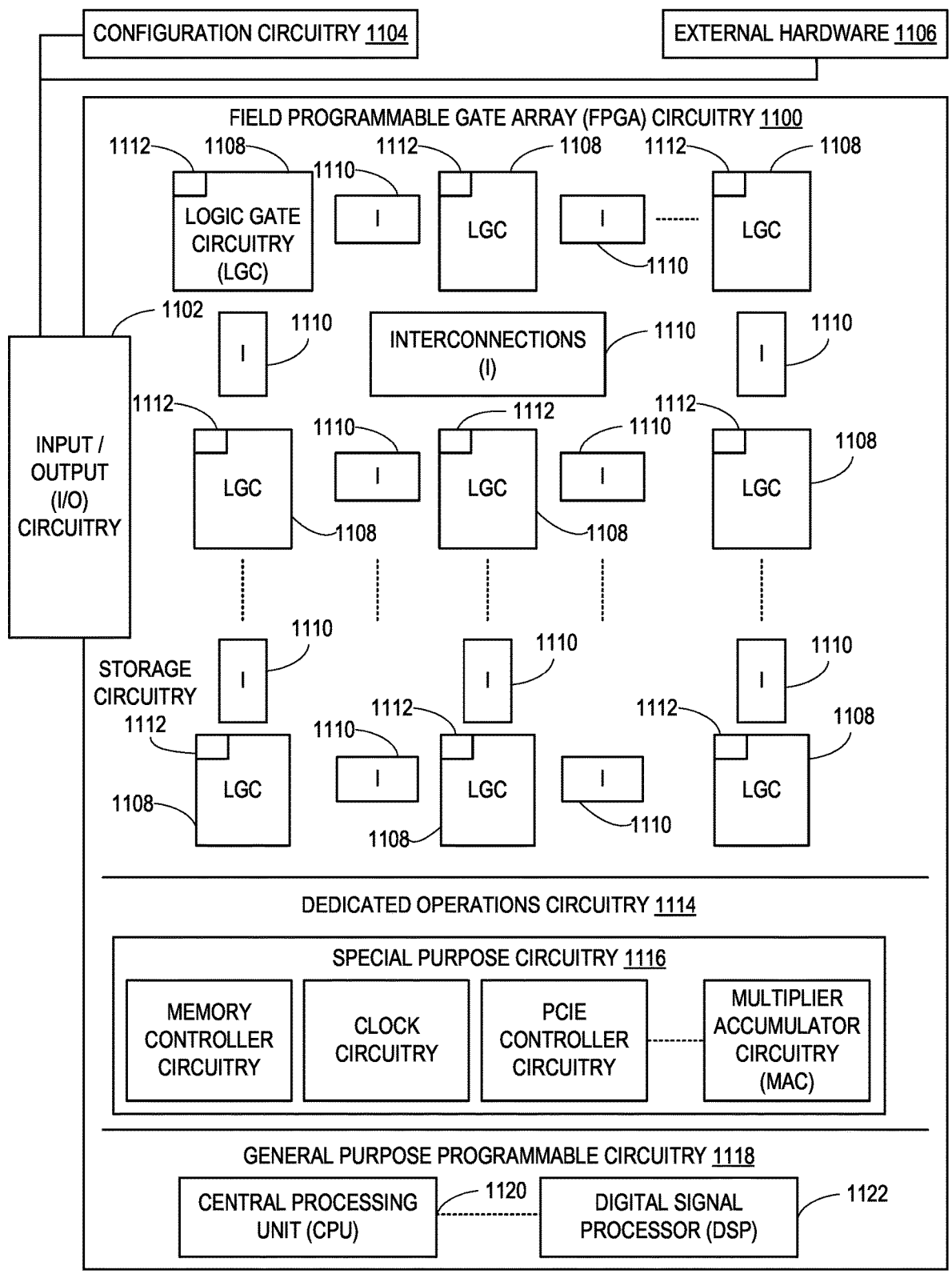
FIG. 11 is a block diagram of another example implementation of the processor circuitry of FIG. 9.

In some examples, the block search circuitry 310 may be instantiated by hardware logic circuitry, which may be implemented by an ASIC, XPU, or the FPGA circuitry 1100 of FIG. 11 structured to perform operations corresponding to the machine readable instructions. Additionally or alternatively, the block search circuitry 310 may be instantiated by any other combination of hardware, software, and/or firmware. For example, the block search circuitry 310 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In the illustrated example of FIG. 3, the motion search circuitry 120 includes a multiplexer (MUX) arbitrator circuitry 308. The example mux arbitrator circuitry 308 obtains cache line requests from one or more sources of cache line requests, namely, the predictor prefetch circuitry 302, the fetch circuitry 304, and the supplemental predictor prefetch circuitry 306. In some examples, the mux arbitrator circuitry 308 integrates cache line requests from each of the three sources (e.g., from three source interconnects that each service cache line requests CLRL 1 (322), CLRL 2 (326), and S CLRL 324, respectively) onto a single interconnect/interface 108 (e.g., data bus) between the motion search circuitry 120 and the memory 104. In some examples, two or more of the three sources of cache line requests may send such requests simultaneously or close to simultaneously, which can lead to contention on the interconnect/interface 108. Thus, the example mux arbitrator circuitry 308 de-multiplexes the three source interconnects onto the single interconnect/interface 108 and then arbitrates the cache line requests in a one-at-a-time order. The example mux arbitrator circuitry 308 may utilize any arbitration policy, such as a first-come-first-serve with a random selection on ties, a policy that prioritizes cache line requests from certain source interconnects over other source interconnects, and/or one or more other arbitration policies.

In the illustrated example of FIG. 3, the mux arbitrator circuitry 308 sends requests 202A to the memory 104 through the L1/L2 cache circuitry 118 and obtains/receives data (data return 204B) from the memory 104 through the L1/L2 cache circuitry 118.

Although the example in FIG. 3 illustrates three separate address translators, PAT 302A, FAT 304A, and SPAT 306A, in some examples, a universal address translator is present in the motion search circuitry 120 on the front end of the multiplexer arbitrator circuitry 308 (instead of the PAT 302A, FAT 304A, and SPAT 306A). Thus, in some examples, the predictor prefetch circuitry 302, the fetch circuitry 304, and the supplemental predictor prefetch circuitry 306 do not internally translate predictor candidates into cache line addresses, but rather send the predictor candidates to the universal address translator at the front end of the multiplexer arbitrator circuitry 308. Internal translation means the address translation occurs within the PAT 302A, FAT 304A, and SPAT 306A, which are in the predictor prefetch circuitry 302, the fetch circuitry 304, and the supplemental predictor prefetch circuitry 306, respectively. Therefore, in some examples, the universal address translator translates predictor candidates (e.g., motion vectors) obtained from all three sources (e.g., the predictor prefetch circuitry 302, the fetch circuitry 304, and the supplemental predictor prefetch circuitry 306) into cache line addresses, which are then filtered through the multiplexer arbitrator circuitry 308 as cache line requests and sent on to the memory 104.

Figure 5:
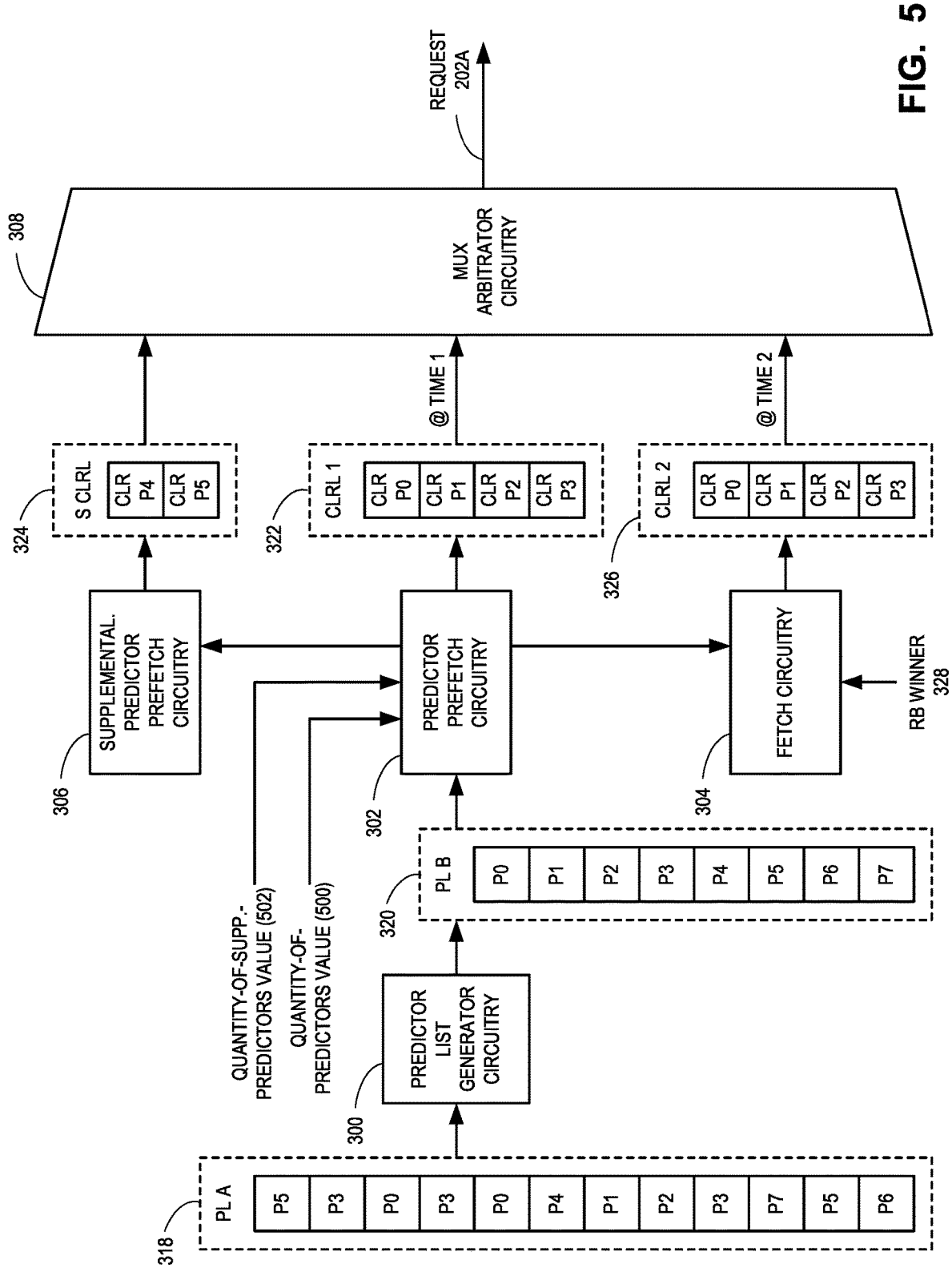
FIG. 5 is an example flow of predictor candidate data through the example motion search circuitry of FIG. 3.

FIG. 5 is an example flow of predictor candidate data through the example motion search circuitry of FIG. 3. Turning to FIG. 4, a predictor list A 318 of predictor candidates is obtained by the predictor list generator circuitry 300. For illustrative purposes, the priorities of predictors are indicated by the number next to the P predictor in the predictor lists shown in FIG. 4 (e.g., P5 in predictor list A 318 is the 6th highest priority predictor, where predictor P0 is the highest priority, P1 is the second highest priority, etc.). The example predictor list generator circuitry 300 sorts the predictor list A 318 in priority order. The example predictor list generator circuitry 300 then removes any redundant predictors (e.g., there are three P3 predictors that are the same motion vector, thus, only one is needed and the other two are redundant and removed). Once both the sorting and the redundancy removal operations are complete, the predictor list generator circuitry 300 provides the resulting (pared down and sorted) predictor list B 320 with predictor candidates P0-P7 to the predictor prefetch circuitry 302.

In some examples, the predictor prefetch circuitry 302 obtains the quantity-of-predictors value 500 and sends the top P quantity/number of predictor candidates from the predictor list B 320 as corresponding cache line requests in CLRL 1 (322) to the memory 104 (where P equals the quantity-of-predictors value 500). For example, P may equal four and therefore the cache line requests corresponding to the top four predictor candidates (e.g., cache line request (CLR) P0 through CLR P3) are sent to the memory 104 through mux arbitrator circuitry 308. The cache line requests in CLRL 1 (322) are sent at a first time (e.g., Time 1). In some examples, Time 1 is a time prior to (e.g., before) a reference block winner from a previous block is determined.

In some examples, the predictor prefetch circuitry 302 obtains the quantity-of-supplemental-predictors value 502 and sends the next top Q quantity/number of predictor candidates below the top P predictor candidates from the predictor list B 320 as supplemental predictor candidates to supplemental predictor prefetch circuitry 306. For example, Q may equal two and therefore the cache line requests corresponding to the 5th and 6th top predictor candidates (e.g., CLR P4 and CLR P5) are sent to the supplemental predictor prefetch circuitry 306.

In some examples, the supplemental predictor prefetch circuitry 306 sends the S CLRL 324 including CLR P4 and CLR P5 to the memory 104.

In some examples, the predictor prefetch circuitry 302 sends the top four predictor candidates (e.g., P0-P3) to the fetch circuitry 304. In some examples, the fetch circuitry 304 sends the cache line requests corresponding to the top four predictor candidates (e.g., CLR P0 through CLR P3) to the memory 104 at a second time (e.g., Time 2). In some examples, Time 2 is a time that coincides with the fetch circuitry 304 receiving a determination of the reference block winner 328 of the previous block.

While an example manner of implementing the motion search circuitry 120 is illustrated in FIG. 3, one or more of the elements, processes, and/or devices illustrated in FIG. 3 may be combined, divided, re-arranged, omitted, eliminated, and/or implemented in any other way. Further, the example predictor list generator circuitry 300, the example predictor prefetch circuitry 302, the example fetch circuitry 304, the example supplemental predictor prefetch circuitry 306, the example mux arbitrator circuitry 308, the example block search circuitry 310, the example local buffer circuitry 312, and/or, more generally, the example motion search circuitry 120 of FIG. 3, may be implemented by hardware alone or by hardware in combination with software and/or firmware. Thus, for example, any of the example predictor list generator circuitry 300, the example predictor prefetch circuitry 302, the example fetch circuitry 304, the example supplemental predictor prefetch circuitry 306, the example mux arbitrator circuitry 308, the example block search circuitry 310, the example local buffer circuitry 312, and/or, more generally, the example motion search circuitry 120, could be implemented by processor circuitry, analog circuit(s), digital circuit(s), logic circuit(s), programmable processor(s), programmable microcontroller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)) such as Field Programmable Gate Arrays (FPGAs). Further still, the example motion search circuitry 120 of FIG. 3 may include one or more elements, processes, and/or devices in addition to, or instead of, those illustrated in FIG. 3, and/or may include more than one of any or all of the illustrated elements, processes and devices.

A flowchart representative of example hardware logic circuitry, machine readable instructions, hardware implemented state machines, and/or any combination thereof for implementing the motion search circuitry 120 of FIG. 3 is shown in FIG. 6. The machine readable instructions may be one or more executable programs or portion(s) of an executable program for execution by processor circuitry, such as the processor circuitry 912 shown in the example processor platform 900 discussed below in connection with FIG. 9 and/or the example processor circuitry discussed below in connection with FIGS. 10 and/or 11. The program may be embodied in software stored on one or more non-transitory computer readable storage media such as a compact disk (CD), a floppy disk, a hard disk drive (HDD), a solid-state drive (SSD), a digital versatile disk (DVD), a Blu-ray disk, a volatile memory (e.g., Random Access Memory (RAM) of any type, etc.), or a non-volatile memory (e.g., electrically erasable programmable read-only memory (EEPROM), FLASH memory, an HDD, an SSD, etc.) associated with processor circuitry located in one or more hardware devices, but the entire program and/or parts thereof could alternatively be executed by one or more hardware devices other than the processor circuitry and/or embodied in firmware or dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a user) or an intermediate client hardware device (e.g., a radio access network (RAN)) gateway that may facilitate communication between a server and an endpoint client hardware device). Similarly, the non-transitory computer readable storage media may include one or more mediums located in one or more hardware devices. Further, although the example program is described with reference to the flowchart illustrated in FIG. 6, many other methods of implementing the example motion search circuitry 120 may alternatively be used. For example, the order of execution of the blocks may be changed, and/or some of the blocks described may be changed, eliminated, or combined. Additionally or alternatively, any or all of the blocks may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more hardware devices (e.g., a single-core processor (e.g., a single core central processor unit (CPU)), a multi-core processor (e.g., a multi-core CPU, an XPU, etc.) in a single machine, multiple processors distributed across multiple servers of a server rack, multiple processors distributed across one or more server racks, a CPU and/or a FPGA located in the same package (e.g., the same integrated circuit (IC) package or in two or more separate housings, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., as portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of machine executable instructions that implement one or more operations that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc., in order to execute the machine readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C #, Perl, Python, JavaScript, HyperText Markup Language (HTML), Structured Query Language (SQL), Swift, etc.

As mentioned above, the example operations of FIGS. 6-8 may be implemented using executable instructions (e.g., computer and/or machine readable instructions) stored on one or more non-transitory computer and/or machine readable media such as optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms non-transitory computer readable medium, non-transitory computer readable storage medium, non-transitory machine readable medium, and non-transitory machine readable storage medium are expressly defined to include any type of computer readable storage device and/or storage disk and to exclude propagating signals and to exclude transmission media. As used herein, the terms "computer readable storage device" and "machine readable storage device" are defined to include any physical (mechanical and/or electrical) structure to store information, but to exclude propagating signals and to exclude transmission media. Examples of computer readable storage devices and machine readable storage devices include random access memory of any type, read only memory of any type, solid state memory, flash memory, optical discs, magnetic disks, disk drives, and/or redundant array of independent disks (RAID) systems. As used herein, the term "device" refers to physical structure such as mechanical and/or electrical equipment, hardware, and/or circuitry that may or may not be configured by computer readable instructions, machine readable instructions, etc., and/or manufactured to execute computer readable instructions, machine readable instructions, etc.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

FIG. 6 is a flowchart representative of example machine readable instructions and/or example operations 600 that may be executed and/or instantiated by processor circuitry to insert high level goal of flowchart. The machine readable instructions and/or the operations 600 of FIG. 6 begin at block 602, at which the predictor list generator circuitry 300 obtains a predictor list that includes a plurality of predictor candidates. The predictor candidates may include hierarchical motion search predictor candidates, spatial predictor candidates, supplementary predictor candidates, and/or temporal predictor candidates, among other types of predictor candidates. The predictor candidates may originate from one or more sources, such as from the encoder front end pipe circuitry 200, from a video driver or an application, or from any one or more other sources capable of providing predictors to the motion search circuitry 120.

At block 604, the predictor list generator circuitry 300 sorts the predictor list in a priority order of the predictor candidates. In some examples, the priority order is determined based on a set of rules associated with priority of predictor types, among other rules.

Next, the process flow enters a loop that walks through at least some of the predictor candidates in the predictor list starting at the first predictor candidate 606A. Thus, the first time through the loop at block 608, the predictor list generator circuitry 300 determines whether the first predictor candidate 606A is used for motion search of the current source block. For example, the block search circuitry 310 may use eight predictor candidates for motion search of the current source block. Therefore, in this example, the top eight predictor candidates (e.g., the first eight predictor candidates in a ranked and sorted version of the predictor list) are prefetched from memory.

Returning to block 608, if the current predictor candidate is used for motion search of the current source block, then, at block 610, the predictor list generator circuitry 300 sends a cache line request to memory corresponding to the current predictor candidate (e.g., the first time through the loop the current predictor candidate is the first predictor candidate 606A).

Once the predictor list generator circuitry 300 completes block 610, the process returns to block 608 for a next iteration of the loop, which the predictor list generator circuitry 300 performs using the next predictor candidate 606B.

Returning to block 608, if the current predictor candidate is not used for motion search of the current source block (e.g., there are eight predictor candidates used for motion search and the current predictor candidate is the ninth highest priority predictor candidate in the ranked and sorted list, then, at block 612, the predictor list generator circuitry 300 sends remaining predictor candidates in the predictor list (e.g., the predictor candidates that are not used for motion search of the current source block) to the supplemental predictor prefetch circuitry 306. In some examples, the predictor list generator circuitry 300 sends a portion of the remaining list of predictor candidates to the supplemental predictor prefetch circuitry 306. For example, the predictor list generator circuitry 300 may send (to the supplemental predictor prefetch circuitry 306) a number of predictor candidates equal to the value stored in the quantity of supplemental predictors storage location 210. In some examples, the predictor list generator circuitry 300 sends all of the remaining list of predictor candidates to the supplemental predictor prefetch circuitry 306.

FIG. 7 is a flowchart representative of example machine readable instructions and/or example operations 700 that may be executed and/or instantiated by processor circuitry to insert high level goal of flowchart. The machine readable instructions and/or the operations 700 of FIG. 7 begin at block 702A, at which supplemental predictor prefetch circuitry 306 enters a loop to walk through at least some supplemental predictor candidates. In some examples, the supplemental predictor candidates are taken from (e.g., derived from) a predictor list starting at a first supplemental predictor candidate 702A. Thus, the first time through the loop at block 704, the supplemental predictor prefetch circuitry 306 determines whether a quantity of supplemental predictors has been reached. In some examples, the quantity of supplemental predictors is a programmable value stored in the quantity-of-supplemental-predictors storage location 210. Thus, in some examples, the supplemental predictor prefetch circuitry 306 compares the current iteration pass count to the quantity-of-supplemental-predictors value stored in the quantity-of-supplemental-predictors storage location 210.

If the quantity has been satisfied (e.g., reached or surpassed, based on whether the comparison is greater than or equal to vs. less than or equal to), the process of FIG. 7 is complete. Otherwise, if the quantity has not been satisfied, then, at block 706, the supplemental predictor prefetch circuitry 306 sends the cache line request to memory corresponding to the current supplemental predictor candidate. Once block 706 has completed, the process flow loops back to block 704 using the next supplemental predictor candidate 702B from the list of predictor candidates.

FIG. 8 is a flowchart representative of example machine readable instructions and/or example operations 800 that may be executed and/or instantiated by processor circuitry to insert high level goal of flowchart. The machine readable instructions and/or the operations 800 of FIG. 8 begin at block 802, at which the block search circuitry 310 determines the reference block winner 328 of the previous block. Once the reference block winner 328 has been determined, then the fetch circuitry 304, at block 804, sends cache line requests to memory that are equal to the cache line requests sent to memory by the predictor prefetch circuitry 306 at block 610 of FIG. 6 and the process of FIG. 8 is complete. In some examples, the predictor prefetch circuitry 306 sends the cache line requests, at block 610, to memory prior to (e.g., before) the fetch circuitry 304 sends the cache line requests to memory at block 804. In some examples, the time difference is due to the fetch circuitry 304 waiting for the reference block winner 328 determination at block 802, whereas the predictor prefetch circuitry 306 is not dependent on the reference block winner 328 determination to send the cache line requests to memory at block 610 of FIG. 6.

Figure 9:
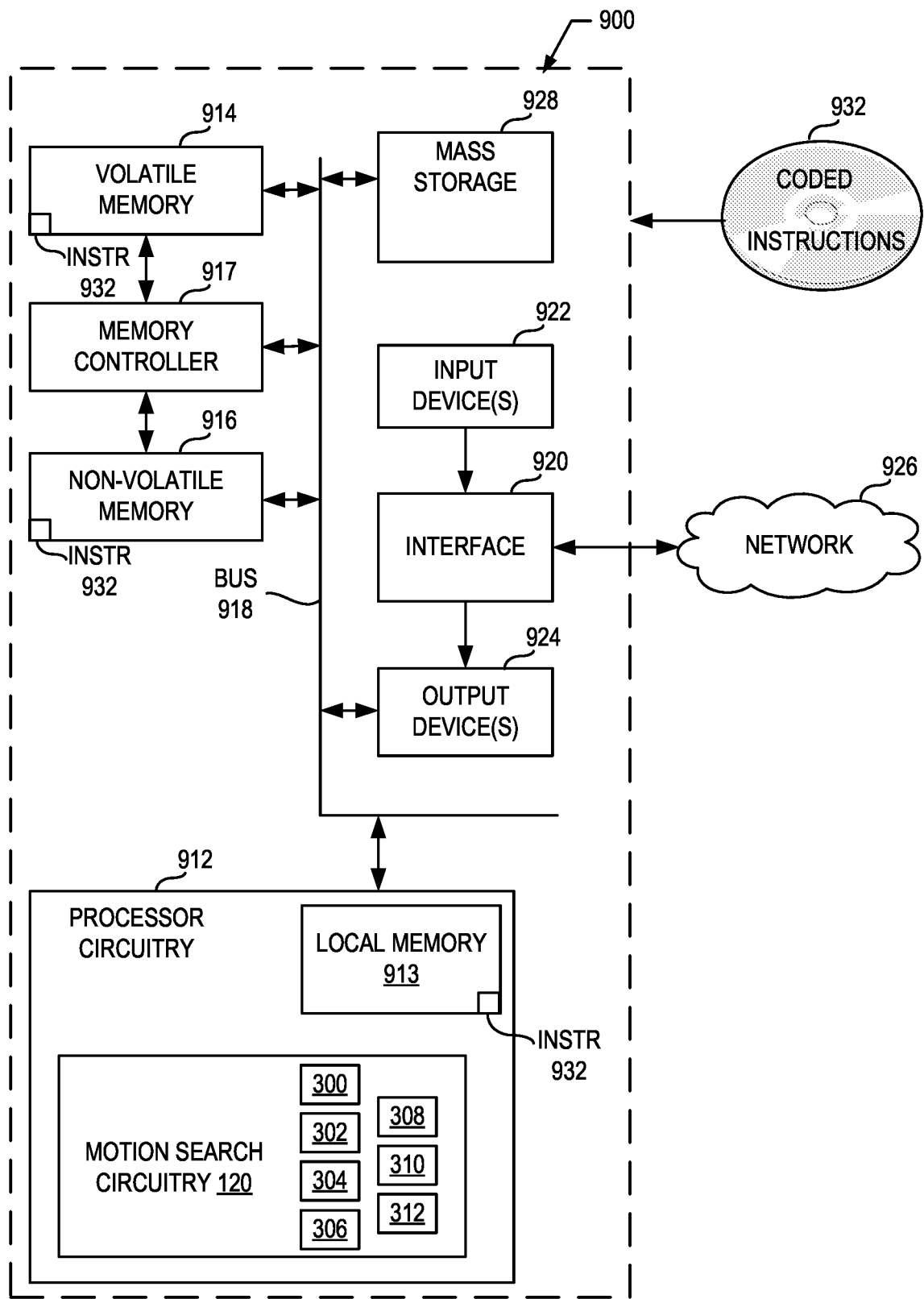
FIG. 9 is a block diagram of an example processing platform including processor circuitry structured to execute the example machine readable instructions and/or the example operations of FIGS. 6-8 to implement motion search circuitry of FIG. 3.

FIG. 9 is a block diagram of an example processor platform 900 structured to execute and/or instantiate the machine readable instructions and/or the operations of FIGS. 6-8 to implement the apparatus of FIG. 3. The processor platform 900 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset (e.g., an augmented reality (AR) headset, a virtual reality (VR) headset, etc.) or other wearable device, or any other type of computing device.

The processor platform 900 of the illustrated example includes processor circuitry 912. The processor circuitry 912 of the illustrated example is hardware. For example, the processor circuitry 912 can be implemented by one or more integrated circuits, logic circuits, FPGAs, microprocessors, CPUs, GPUs, DSPs, and/or microcontrollers from any desired family or manufacturer. The processor circuitry 912 may be implemented by one or more semiconductor based (e.g., silicon based) devices. In this example, the processor circuitry 912 implements the predictor list generator circuitry 300, the predictor prefetch circuitry 302, the fetch circuitry 304, the supplemental predictor prefetch circuitry 306, the mux arbitrator circuitry 308, the block search circuitry 310, the local buffer circuitry 312, and/or, more generally, the example motion search circuitry 120.

The processor circuitry 912 of the illustrated example includes a local memory 913 (e.g., a cache, registers, etc.). The processor circuitry 912 of the illustrated example is in communication with a main memory including a volatile memory 914 and a non-volatile memory 916 by a bus 918. The volatile memory 914 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 916 may be implemented by flash memory and/or any other desired type of memory device. Access to the main memory 914, 916 of the illustrated example is controlled by a memory controller 917.

The processor platform 900 of the illustrated example also includes interface circuitry 920. The interface circuitry 920 may be implemented by hardware in accordance with any type of interface standard, such as an Ethernet interface, a universal serial bus (USB) interface, a Bluetooth® interface, a near field communication (NFC) interface, a Peripheral Component Interconnect (PCI) interface, and/or a Peripheral Component Interconnect Express (PCIe) interface.

In the illustrated example, one or more input devices 922 are connected to the interface circuitry 920. The input device(s) 922 permit(s) a user to enter data and/or commands into the processor circuitry 912. The input device(s) 922 can be implemented by, for example, an audio sensor, a microphone, a camera (still or video), a keyboard, a button, a mouse, a touchscreen, a track-pad, a trackball, an isopoint device, and/or a voice recognition system.

One or more output devices 924 are also connected to the interface circuitry 920 of the illustrated example. The output device(s) 924 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 920 of the illustrated example, thus, typically includes a graphics driver card, a graphics driver chip, and/or graphics processor circuitry such as a GPU.

The interface circuitry 920 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 926. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 900 of the illustrated example also includes one or more mass storage devices 928 to store software and/or data. Examples of such mass storage devices 928 include magnetic storage devices, optical storage devices, floppy disk drives, HDDs, CDs, Blu-ray disk drives, redundant array of independent disks (RAID) systems, solid state storage devices such as flash memory devices and/or SSDs, and DVD drives.

The machine readable instructions 932, which may be implemented by the machine readable instructions of FIGS. 6-8, may be stored in the mass storage device 928, in the volatile memory 914, in the non-volatile memory 916, and/or on a removable non-transitory computer readable storage medium such as a CD or DVD.

Figure 10:
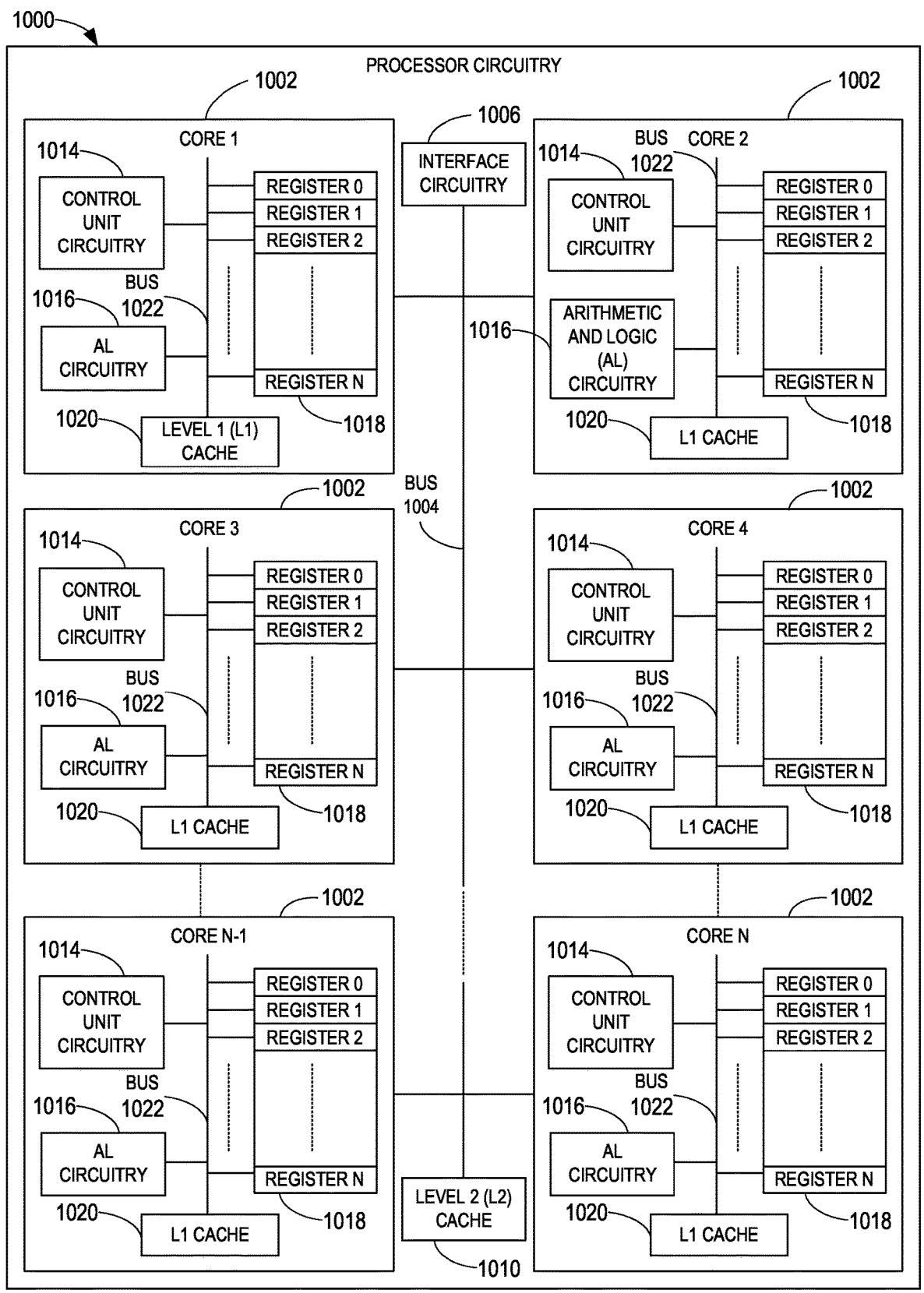
FIG. 10 is a block diagram of an example implementation of the processor circuitry of FIG. 9.

FIG. 10 is a block diagram of an example implementation of the processor circuitry 912 of FIG. 9. In this example, the processor circuitry 912 of FIG. 9 is implemented by a microprocessor 1000. For example, the microprocessor 1000 may be a general purpose microprocessor (e.g., general purpose microprocessor circuitry). The microprocessor 1000 executes some or all of the machine readable instructions of the flowcharts of FIGS. 6-8 to effectively instantiate the circuitry of FIG. 3 as logic circuits to perform the operations corresponding to those machine readable instructions. In some such examples, the circuitry of FIG. 3 is instantiated by the hardware circuits of the microprocessor 1000 in combination with the instructions. For example, the microprocessor 1000 may be implemented by multi-core hardware circuitry such as a CPU, a DSP, a GPU, an XPU, etc. Although it may include any number of example cores 1002 (e.g., 1 core), the microprocessor 1000 of this example is a multi-core semiconductor device including N cores. The cores 1002 of the microprocessor 1000 may operate independently or may cooperate to execute machine readable instructions. For example, machine code corresponding to a firmware program, an embedded software program, or a software program may be executed by one of the cores 1002 or may be executed by multiple ones of the cores 1002 at the same or different times. In some examples, the machine code corresponding to the firmware program, the embedded software program, or the software program is split into threads and executed in parallel by two or more of the cores 1002. The software program may correspond to a portion or all of the machine readable instructions and/or operations represented by the flowcharts of FIGS. 6-8.

The cores 1002 may communicate by a first example bus 1004. In some examples, the first bus 1004 may be implemented by a communication bus to effectuate communication associated with one(s) of the cores 1002. For example, the first bus 1004 may be implemented by at least one of an Inter-Integrated Circuit (I2C) bus, a Serial Peripheral Interface (SPI) bus, a PCI bus, or a PCIe bus. Additionally or alternatively, the first bus 1004 may be implemented by any other type of computing or electrical bus. The cores 1002 may obtain data, instructions, and/or signals from one or more external devices by example interface circuitry 1006. The cores 1002 may output data, instructions, and/or signals to the one or more external devices by the interface circuitry 1006. Although the cores 1002 of this example include example local memory 1020 (e.g., Level 1 (L1) cache that may be split into an L1 data cache and an L1 instruction cache), the microprocessor 1000 also includes example shared memory 1010 that may be shared by the cores (e.g., Level 2 (L2 cache)) for high-speed access to data and/or instructions. Data and/or instructions may be transferred (e.g., shared) by writing to and/or reading from the shared memory 1010. The local memory 1020 of each of the cores 1002 and the shared memory 1010 may be part of a hierarchy of storage devices including multiple levels of cache memory and the main memory (e.g., the main memory 914, 916 of FIG. 9). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 1002 may be referred to as a CPU, DSP, GPU, etc., or any other type of hardware circuitry. Each core 1002 includes control unit circuitry 1014, arithmetic and logic (AL) circuitry (sometimes referred to as an ALU) 1016, a plurality of registers 1018, the local memory 1020, and a second example bus 1022. Other structures may be present. For example, each core 1002 may include vector unit circuitry, single instruction multiple data (SIMD) unit circuitry, load/store unit (LSU) circuitry, branch/jump unit circuitry, floating-point unit (FPU) circuitry, etc. The control unit circuitry 1014 includes semiconductor-based circuits structured to control (e.g., coordinate) data movement within the corresponding core 1002. The AL circuitry 1016 includes semiconductor-based circuits structured to perform one or more mathematic and/or logic operations on the data within the corresponding core 1002. The AL circuitry 1016 of some examples performs integer based operations. In other examples, the AL circuitry 1016 also performs floating point operations. In yet other examples, the AL circuitry 1016 may include first AL circuitry that performs integer based operations and second AL circuitry that performs floating point operations. In some examples, the AL circuitry 1016 may be referred to as an Arithmetic Logic Unit (ALU). The registers 1018 are semiconductor-based structures to store data and/or instructions such as results of one or more of the operations performed by the AL circuitry 1016 of the corresponding core 1002. For example, the registers 1018 may include vector register(s), SIMD register(s), general purpose register(s), flag register(s), segment register(s), machine specific register(s), instruction pointer register(s), control register(s), debug register(s), memory management register(s), machine check register(s), etc. The registers 1018 may be arranged in a bank as shown in FIG. 10. Alternatively, the registers 1018 may be organized in any other arrangement, format, or structure including distributed throughout the core 1002 to shorten access time. The second bus 1022 may be implemented by at least one of an I2C bus, a SPI bus, a PCI bus, or a PCIe bus Each core 1002 and/or, more generally, the microprocessor 1000 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 1000 is a semiconductor device fabricated to include many transistors interconnected to implement the structures described above in one or more integrated circuits (ICs) contained in one or more packages. The processor circuitry may include and/or cooperate with one or more accelerators. In some examples, accelerators are implemented by logic circuitry to perform certain tasks more quickly and/or efficiently than can be done by a general purpose processor. Examples of accelerators include ASICs and FPGAs such as those discussed herein. A GPU or other programmable device can also be an accelerator. Accelerators may be on-board the processor circuitry, in the same chip package as the processor circuitry and/or in one or more separate packages from the processor circuitry.

FIG. 6 is a block diagram of another example implementation of the processor circuitry 912 of FIG. 9. In this example, the processor circuitry 912 is implemented by FPGA circuitry 1100. For example, the FPGA circuitry 1100 may be implemented by an FPGA. The FPGA circuitry 1100 can be used, for example, to perform operations that could otherwise be performed by the example microprocessor 1000 of FIG. 10 executing corresponding machine readable instructions. However, once configured, the FPGA circuitry 1100 instantiates the machine readable instructions in hardware and, thus, can often execute the operations faster than they could be performed by a general purpose microprocessor executing the corresponding software.

More specifically, in contrast to the microprocessor 1000 of FIG. 10 described above (which is a general purpose device that may be programmed to execute some or all of the machine readable instructions represented by the flowcharts of FIGS. 6-8 but whose interconnections and logic circuitry are fixed once fabricated), the FPGA circuitry 1100 of the example of FIG. 11 includes interconnections and logic circuitry that may be configured and/or interconnected in different ways after fabrication to instantiate, for example, some or all of the machine readable instructions represented by the flowcharts of FIGS. 6-8. In particular, the FPGA circuitry 1100 may be thought of as an array of logic gates, interconnections, and switches. The switches can be programmed to change how the logic gates are interconnected by the interconnections, effectively forming one or more dedicated logic circuits (unless and until the FPGA circuitry 1100 is reprogrammed). The configured logic circuits enable the logic gates to cooperate in different ways to perform different operations on data received by input circuitry. Those operations may correspond to some or all of the software represented by the flowcharts of FIGS. 6-8. As such, the FPGA circuitry 1100 may be structured to effectively instantiate some or all of the machine readable instructions of the flowcharts of FIGS. 6-8 as dedicated logic circuits to perform the operations corresponding to those software instructions in a dedicated manner analogous to an ASIC. Therefore, the FPGA circuitry 1100 may perform the operations corresponding to the some or all of the machine readable instructions of FIGS. 6-8 faster than the general purpose microprocessor can execute the same.

In the example of FIG. 11, the FPGA circuitry 1100 is structured to be programmed (and/or reprogrammed one or more times) by an end user by a hardware description language (HDL) such as Verilog. The FPGA circuitry 1100 of FIG. 11, includes example input/output (I/O) circuitry 1102 to obtain and/or output data to/from example configuration circuitry 1104 and/or external hardware 1106. For example, the configuration circuitry 1104 may be implemented by interface circuitry that may obtain machine readable instructions to configure the FPGA circuitry 1100, or portion(s) thereof. In some such examples, the configuration circuitry 1104 may obtain the machine readable instructions from a user, a machine (e.g., hardware circuitry (e.g., programmed or dedicated circuitry) that may implement an Artificial Intelligence/Machine Learning (AI/ML) model to generate the instructions), etc. In some examples, the external hardware 1106 may be implemented by external hardware circuitry. For example, the external hardware 1106 may be implemented by the microprocessor 1000 of FIG. 10. The FPGA circuitry 1100 also includes an array of example logic gate circuitry 1108, a plurality of example configurable interconnections 1110, and example storage circuitry 1112. The logic gate circuitry 1108 and the configurable interconnections 1110 are configurable to instantiate one or more operations that may correspond to at least some of the machine readable instructions of FIGS. 6-8 and/or other desired operations. The logic gate circuitry 1108 shown in FIG. 11 is fabricated in groups or blocks. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 1108 to enable configuration of the electrical structures and/or the logic gates to form circuits to perform desired operations. The logic gate circuitry 1108 may include other electrical structures such as look-up tables (LUTs), registers (e.g., flip-flops or latches), multiplexers, etc.

The configurable interconnections 1110 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 1108 to program desired logic circuits.

The storage circuitry 1112 of the illustrated example is structured to store result(s) of the one or more of the operations performed by corresponding logic gates. The storage circuitry 1112 may be implemented by registers or the like. In the illustrated example, the storage circuitry 1112 is distributed amongst the logic gate circuitry 1108 to facilitate access and increase execution speed.

The example FPGA circuitry 1100 of FIG. Y also includes example Dedicated Operations Circuitry 1114. In this example, the Dedicated Operations Circuitry 1114 includes special purpose circuitry 1116 that may be invoked to implement commonly used functions to avoid the need to program those functions in the field. Examples of such special purpose circuitry 1116 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 1100 may also include example general purpose programmable circuitry 1118 such as an example CPU 1120 and/or an example DSP 1122. Other general purpose programmable circuitry 1118 may additionally or alternatively be present such as a GPU, an XPU, etc., that can be programmed to perform other operations.

Although FIGS. 10 and 6 illustrate two example implementations of the processor circuitry 912 of FIG. 9, many other approaches are contemplated. For example, as mentioned above, modern FPGA circuitry may include an on-board CPU, such as one or more of the example CPU 1120 of FIG. 11. Therefore, the processor circuitry 912 of FIG. 9 may additionally be implemented by combining the example microprocessor 1000 of FIG. 10 and the example FPGA circuitry 1100 of FIG. 11. In some such hybrid examples, a first portion of the machine readable instructions represented by the flowcharts of FIGS. 6-8 may be executed by one or more of the cores 1002 of FIG. 10, a second portion of the machine readable instructions represented by the flowcharts of FIGS. 6-8 may be executed by the FPGA circuitry 1100 of FIG. 11, and/or a third portion of the machine readable instructions represented by the flowcharts of FIGS. 6-8 may be executed by an ASIC. It should be understood that some or all of the circuitry of FIG. 3 may, thus, be instantiated at the same or different times. Some or all of the circuitry may be instantiated, for example, in one or more threads executing concurrently and/or in series. Moreover, in some examples, some or all of the circuitry of FIG. 3 may be implemented within one or more virtual machines and/or containers executing on the microprocessor.

In some examples, the processor circuitry 912 of FIG. 9 may be in one or more packages. For example, the microprocessor 1000 of FIG. 10 and/or the FPGA circuitry 1100 of FIG. 11 may be in one or more packages. In some examples, an XPU may be implemented by the processor circuitry 912 of FIG. 9, which may be in one or more packages. For example, the XPU may include a CPU in one package, a DSP in another package, a GPU in yet another package, and an FPGA in still yet another package.

Figure 12:
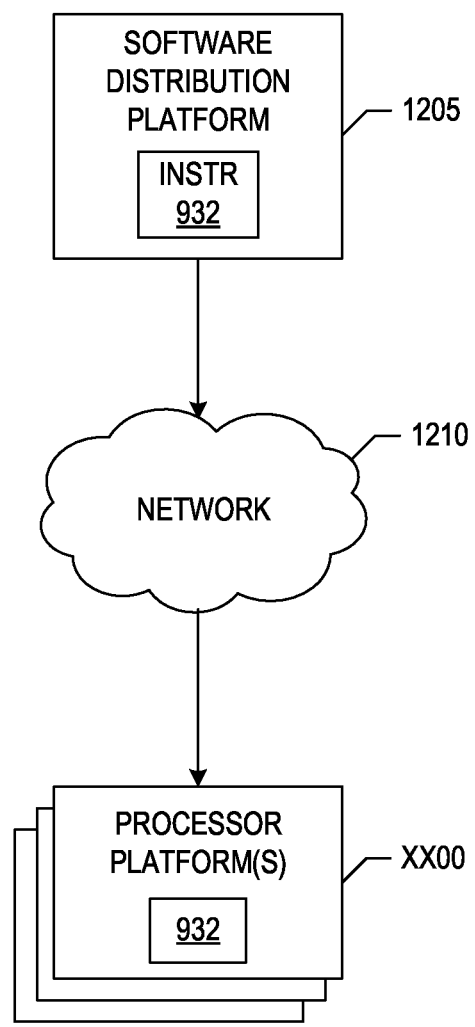
FIG. 12 is a block diagram of an example software distribution platform (e.g., one or more servers) to distribute software (e.g., software corresponding to the example machine readable instructions of FIGS. 6-8) to client devices associated with end users and/or consumers (e.g., for license, sale, and/or use), retailers (e.g., for sale, re-sale, license, and/or sub-license), and/or original equipment manufacturers (OEMs) (e.g., for inclusion in products to be distributed to, for example, retailers and/or to other end users such as direct buy customers).

A block diagram illustrating an example software distribution platform 1205 to distribute software such as the example machine readable instructions 932 of FIG. 9 to hardware devices owned and/or operated by third parties is illustrated in FIG. 12. The example software distribution platform 1205 may be implemented by any computer server, data facility, cloud service, etc., capable of storing and transmitting software to other computing devices. The third parties may be customers of the entity owning and/or operating the software distribution platform 1205. For example, the entity that owns and/or operates the software distribution platform 1205 may be a developer, a seller, and/or a licensor of software such as the example machine readable instructions 932 of FIG. 9. The third parties may be consumers, users, retailers, OEMs, etc., who purchase and/or license the software for use and/or re-sale and/or sub-licensing. In the illustrated example, the software distribution platform 1205 includes one or more servers and one or more storage devices. The storage devices store the machine readable instructions 932, which may correspond to the example machine readable instructions 600, 800, etc. of FIGS. 6-8, as described above. The one or more servers of the example software distribution platform 1205 are in communication with an example network 1210, which may correspond to any one or more of the Internet and/or any of the example networks described above. In some examples, the one or more servers are responsive to requests to transmit the software to a requesting party as part of a commercial transaction. Payment for the delivery, sale, and/or license of the software may be handled by the one or more servers of the software distribution platform and/or by a third party payment entity. The servers enable purchasers and/or licensors to download the machine readable instructions 932 from the software distribution platform 1205. For example, the software, which may correspond to the example machine readable instructions 600, 800, etc. of FIGS. 6-8, may be downloaded to the example processor platform 900, which is to execute the machine readable instructions 932 to implement the motion search circuitry 120 of FIG. 3. In some examples, one or more servers of the software distribution platform 1205 periodically offer, transmit, and/or force updates to the software (e.g., the example machine readable instructions 932 of FIG. 9) to ensure improvements, patches, updates, etc., are distributed and applied to the software at the end user devices.

FIG. 13 illustrates performance data with predictor prefetch enabled in processor Silicon. The test content column describes the types of frames on which the tests were performed. P frames mean frames that use prediction from a single preceding reference frame. B frames mean frames that use prediction from an average of two reference frames, one that precedes the current source frame and one that succeeds the current source frame. The test content of P frames included 128 frames and the test content of B frames included 838 frames. The second column shows when tests were performed with memory compression on or off. The third column shows the baseline time in milliseconds it took to encode the test frames with no predictor prefetch enabled. The fourth column shows the time it took to encode the test frames with predictor prefetch enabled. The percentage shown in the fourth column indicates the efficiency gained (e.g., how much time was saved in percentages against the baseline column). Finally, the fifth column shows the time it took to encode the test frames with predictor prefetch enabled and a left predictor disabled for fetch. The left predictor refers to the reference block winner from the previous frame (e.g., left frame).

From the foregoing, it will be appreciated that example systems, methods, apparatus, and articles of manufacture have been disclosed that implement predictor prefetching in video encoding. Disclosed systems, methods, apparatus, and articles of manufacture improve the efficiency of using a computing device by improving the efficiency of video encoding by filling the L1/L2 cache with cache lines of data that correspond to reference blocks a video encoder needs. Thus, there will be less round trip latency on cache line requests for motion search requirements, which can improve the overall speed of the video encoder. Disclosed systems, methods, apparatus, and articles of manufacture are accordingly directed to one or more improvement(s) in the operation of a machine such as a computer or other electronic and/or mechanical device.

Further examples and combinations thereof include the following:

Example 1 includes an apparatus to prefetch predictors for video encoding, comprising interface circuitry to at least communicatively couple a processor circuitry and a memory, and processor circuitry including one or more of at least one of a central processor unit, a graphics processor unit, or a digital signal processor, the at least one of the central processor unit, the graphics processor unit, or the digital signal processor having control circuitry to control data movement within the processor circuitry, arithmetic and logic circuitry to perform one or more first operations corresponding to instructions, and one or more registers to store a result of the one or more first operations, the instructions in the apparatus, a Field Programmable Gate Array (FPGA), the FPGA including logic gate circuitry, a plurality of configurable interconnections, and storage circuitry, the logic gate circuitry and the plurality of the configurable interconnections to perform one or more second operations, the storage circuitry to store a result of the one or more second operations, or Application Specific Integrated Circuitry (ASIC) including logic gate circuitry to perform one or more third operations, the processor circuitry to perform at least one of the first operations, the second operations, or the third operations to instantiate predictor list generator circuitry to obtain a plurality of predictor candidates, the plurality of predictor candidates each indicating a memory location storing a reference block from a previous block, and sort the plurality of predictor candidates in a priority order, and predictor prefetch circuitry to send ones of cache line requests to the memory, each of the cache line requests corresponding to a predictor candidate of the plurality of predictor candidates used for a motion search of a current source block, the cache line requests sent to the memory before a reference block winner of the previous block is determined.

Example 2 includes the apparatus of example 1, wherein ones of predictor candidates are ones of primary predictor candidates, wherein the processor circuitry to perform at least one of the first operations, the second operations, or the third operations to instantiate the predictor prefetch circuitry to send ones of predictor candidates not used for the motion search of the current source block to supplemental predictor prefetch circuitry as ones of supplemental predictor candidates.

Example 3 includes the apparatus of example 2, wherein the ones of cache line requests are first ones of cache line requests, and wherein the processor circuitry to perform at least one of the first operations, the second operations, or the third operations to instantiate a supplemental predictor prefetch circuitry to send second ones of cache line requests to the memory, the second ones of cache line requests corresponding to at least one of the ones of supplemental predictor candidates.

Example 4 includes the apparatus of example 3, wherein the ones of supplemental predictor candidates include at least one neighbor predictor candidate to at least one of the plurality of predictor candidates.

Example 5 includes the apparatus of example 3, further including a storage location for a quantity of supplemental predictors programmable value, and wherein the processor circuitry to perform at least one of the first operations, the second operations, or the third operations to instantiate the supplemental predictor prefetch circuitry to send a number of the second ones of cache line requests equal to the quantity of supplemental predictors programmable value.

Example 6 includes the apparatus of example 1, wherein ones of cache line requests are first ones of cache line requests, and wherein the processor circuitry to perform at least one of the first operations, the second operations, or the third operations to instantiate block search circuitry to determine the reference block winner, and fetch circuitry to send third ones of cache line requests to the memory in response to the reference block winner determination, the third ones of cache line requests equal to the first ones of cache line requests.

Example 7 includes the apparatus of example 1, wherein the plurality of predictor candidates include at least one of a hierarchical search predictor candidate, a spatial predictor candidate, a supplementary predictor candidate, or a temporal predictor candidate.

Example 8 includes the apparatus of example 1, wherein the processor circuitry to perform at least one of the first operations, the second operations, or the third operations to instantiate the predictor list generator circuitry to remove redundant ones of predictor candidates of the plurality of predictor candidates.

Example 9 includes At least one non-transitory computer-readable storage medium comprising instructions that, when executed, cause one or more processors of a machine to at least obtain a plurality of predictor candidates, the plurality of predictor candidates each indicating a memory location storing a reference block from a previous block, sort the plurality of predictor candidates in a priority order, and send ones of cache line requests to the memory, each of the cache line requests corresponding to a predictor candidate of the plurality of predictor candidates used for a motion search of a current source block, the cache line requests sent to the memory before a reference block winner of the previous block is determined.

Example 10 includes the at least one non-transitory computer-readable storage medium of example 9, wherein the instructions, when executed, cause one or more processors of a machine to at least send additional ones of predictor candidates not used for the motion search of the current source block to supplemental predictor prefetch circuitry as ones of supplemental predictor candidates.

Example 11 includes the at least one non-transitory computer-readable storage medium of example 10, wherein the ones of cache line requests are first ones of cache line requests, and wherein the instructions, when executed, cause one or more processors of a machine to at least send second ones of cache line requests to the memory, the second ones of cache line requests corresponding to at least one of the ones of supplemental predictor candidates.

Example 12 includes the at least one non-transitory computer-readable storage medium of example 11, wherein the ones of supplemental predictor candidates include at least one neighbor predictor candidate to at least one of the plurality of predictor candidates.

Example 13 includes the at least one non-transitory computer-readable storage medium of example 11, further including a storage location for a quantity of supplemental predictors programmable value, and wherein the instructions, when executed, cause one or more processors of a machine to at least send a number of the second ones of cache line requests equal to the quantity of supplemental predictors programmable value.

Example 14 includes the at least one non-transitory computer-readable storage medium of example 9, wherein ones of cache line requests are first ones of cache line requests, and wherein the instructions, when executed, cause one or more processors of a machine to at least determine the reference block winner, and send third ones of cache line requests to the memory in response to the reference block winner determination, the third ones of cache line requests equal to the first ones of cache line requests.

Example 15 includes the at least one non-transitory computer-readable storage medium of example 9, wherein the plurality of predictor candidates includes at least one of a hierarchical search predictor candidate, a spatial predictor candidate, a supplementary predictor candidate, or a temporal predictor candidate.

Example 16 includes the at least one non-transitory computer-readable storage medium of example 9, wherein the instructions, when executed, cause one or more processors of a machine to at least remove redundant ones of predictor candidates of the plurality of predictor candidates.

Example 17 includes an apparatus comprising means for obtaining a plurality of predictor candidates, the plurality of predictor candidates each indicating a memory location storing a reference block from a previous block, sorting the plurality of predictor candidates in a priority order, and sending ones of cache line requests to the memory, each of the cache line requests corresponding to a predictor candidate of the plurality of predictor candidates used for a motion search of a current source block, the cache line requests sent to the memory before a reference block winner of the previous block is determined.

Example 18 includes the apparatus of example 17, further including means for sending additional ones of predictor candidates not used for the motion search of the current source block to supplemental predictor prefetch circuitry as ones of supplemental predictor candidates.

Example 19 includes the apparatus of example 18, wherein the ones of cache line requests are first ones of cache line requests, further including means for sending second ones of cache line requests to the memory, the second ones of cache line requests corresponding to at least one of the ones of supplemental predictor candidates.

Example 20 includes the apparatus of example 19, wherein the ones of supplemental predictor candidates include at least one neighbor predictor candidate to at least one of the plurality of predictor candidates.

Example 21 includes the apparatus of example 19, including a storage location for a quantity of supplemental predictors programmable value, further including means for sending a number of the second ones of cache line requests equal to the quantity of supplemental predictors programmable value.

Example 22 includes the apparatus of example 17, wherein ones of cache line requests are first ones of cache line requests, further including means for determining the reference block winner, and sending third ones of cache line requests to the memory in response to the reference block winner determination, the third ones of cache line requests equal to the first ones of cache line requests.

Example 23 includes the apparatus of example 17, wherein the plurality of predictor candidates includes at least one of a hierarchical search predictor candidate, a spatial predictor candidate, a supplementary predictor candidate, or a temporal predictor candidate.

Example 24 includes the apparatus of example 17, further including means for removing redundant ones of predictor candidates of the plurality of predictor candidates.

Example 25 includes a method, comprising obtaining a plurality of predictor candidates, the plurality of predictor candidates each indicating a memory location storing a reference block from a previous block, sorting the plurality of predictor candidates in a priority order, and sending ones of cache line requests to the memory, each of the cache line requests corresponding to a predictor candidate of the plurality of predictor candidates used for a motion search of a current source block, the cache line requests sent to the memory before a reference block winner of the previous block is determined.

Example 26 includes the method of example 25, further including sending additional ones of predictor candidates not used for the motion search of the current source block to supplemental predictor prefetch circuitry as ones of supplemental predictor candidates.

Example 27 includes the method of example 26, wherein the ones of cache line requests are first ones of cache line requests, further including sending second ones of cache line requests to the memory, the second ones of cache line requests corresponding to at least one of the ones of supplemental predictor candidates.

Example 28 includes the method of example 27, wherein the ones of supplemental predictor candidates include at least one neighbor predictor candidate to at least one of the plurality of predictor candidates.

Example 29 includes the method of example 27, including a storage location for a quantity of supplemental predictors programmable value, further including sending a number of the second ones of cache line requests equal to the quantity of supplemental predictors programmable value.

Example 30 includes the method of example 25, wherein ones of cache line requests are first ones of cache line requests, further including determining the reference block winner, and sending third ones of cache line requests to the memory in response to the reference block winner determination, the third ones of cache line requests equal to the first ones of cache line requests.

Example 31 includes the method of example 25, wherein the plurality of predictor candidates includes at least one of a hierarchical search predictor candidate, a spatial predictor candidate, a supplementary predictor candidate, or a temporal predictor candidate.

Example 32 includes the method of example 25, further including removing redundant ones of predictor candidates of the plurality of predictor candidates.

The following claims are hereby incorporated into this Detailed Description by this reference. Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

What is claimed is:

1. An apparatus to prefetch predictors for video encoding, the apparatus comprising:
    interface circuitry to at least communicatively couple a processor circuitry and a memory; and
    the processor circuitry including one or more of:
        at least one of a central processor unit, a graphics processor unit, or a digital signal processor, the at least one of the central processor unit, the graphics processor unit, or the digital signal processor having control circuitry to control data movement within the processor circuitry, arithmetic and logic circuitry to perform one or more first operations corresponding to instructions, and one or more registers to store a result of the one or more first operations, the instructions in the apparatus;
        a Field Programmable Gate Array (FPGA), the FPGA including logic gate circuitry, a plurality of configurable interconnections, and storage circuitry, the logic gate circuitry and the plurality of the configurable interconnections to perform one or more second operations, the storage circuitry to store a result of the one or more second operations; or
        Application Specific Integrated Circuitry (ASIC) including logic gate circuitry to perform one or more third operations;
    the processor circuitry to perform at least one of the first operations, the second operations, or the third operations to instantiate:
        predictor list generator circuitry to:
            obtain a plurality of predictor candidates, the plurality of predictor candidates each indicating a memory location storing a reference block from a previous block;
            sort the plurality of predictor candidates in a priority order; and
        predictor prefetch circuitry to send ones of cache line requests to the memory, each of the cache line requests corresponding to a predictor candidate of the plurality of predictor candidates used for a motion search of a current source block, the cache line requests sent to the memory before a reference block winner of the previous block is determined.

2. The apparatus of claim 1, wherein ones of the predictor candidates are ones of primary predictor candidates, and the processor circuitry to perform at least one of the first operations, the second operations, or the third operations to instantiate:

the predictor prefetch circuitry to send ones of predictor candidates not used for the motion search of the current source block to supplemental predictor prefetch circuitry as ones of supplemental predictor candidates.

3. The apparatus of claim 2, wherein the ones of cache line requests are first ones of cache line requests, and the processor circuitry is to perform at least one of the first operations, the second operations, or the third operations to instantiate:

a supplemental predictor prefetch circuitry to send second ones of cache line requests to the memory, the second ones of cache line requests corresponding to at least one of the ones of supplemental predictor candidates.

4. The apparatus of claim 3, wherein the ones of supplemental predictor candidates include at least one neighbor predictor candidate to at least one of the plurality of predictor candidates.

5. The apparatus of claim 3, including a storage location for a quantity of supplemental predictors programmable value, and wherein the processor circuitry is to perform at least one of the first operations, the second operations, or the third operations to instantiate:

the supplemental predictor prefetch circuitry to send a number of the second ones of cache line requests equal to the quantity of supplemental predictors programmable value.

6. The apparatus of claim 1, wherein ones of the cache line requests are first ones of cache line requests, and the processor circuitry is to perform at least one of the first operations, the second operations, or the third operations to instantiate:

block search circuitry to determine the reference block winner; and fetch circuitry to send third ones of cache line requests to the memory in response to the reference block winner determination, the third ones of cache line requests equal to the first ones of cache line requests.

7. The apparatus of claim 1, wherein the plurality of predictor candidates include at least one of a hierarchical search predictor candidate, a spatial predictor candidate, a supplementary predictor candidate, or a temporal predictor candidate.

8. The apparatus of claim 1, wherein the processor circuitry is to perform at least one of the first operations, the second operations, or the third operations to instantiate:

the predictor list generator circuitry to remove redundant ones of predictor candidates of the plurality of predictor candidates.

9. At least one non-transitory computer-readable storage medium comprising instructions that, when executed, cause one or more processors of a machine to at least:

obtain a plurality of predictor candidates, the plurality of predictor candidates each indicating a memory location storing a reference block from a previous block;

sort the plurality of predictor candidates in a priority order; and send ones of cache line requests to a memory, each of the cache line requests corresponding to a predictor candidate of the plurality of predictor candidates used for a motion search of a current source block, the cache line requests sent to the memory before a reference block winner of the previous block is determined.

10. The at least one non-transitory computer-readable storage medium of claim 9, wherein the instructions, when executed, cause one or more processors of a machine to at least:

send additional ones of predictor candidates not used for the motion search of the current source block to supplemental predictor prefetch circuitry as ones of supplemental predictor candidates.

11. The at least one non-transitory computer-readable storage medium of claim 10, wherein the ones of the cache line requests are first ones of cache line requests, and the instructions, when executed, cause one or more processors of a machine to at least:

send second ones of cache line requests to the memory, the second ones of cache line requests corresponding to at least one of the ones of supplemental predictor candidates.

12. The at least one non-transitory computer-readable storage medium of claim 11, wherein the ones of the supplemental predictor candidates include at least one neighbor predictor candidate to at least one of the plurality of predictor candidates.

13. The at least one non-transitory computer-readable storage medium of claim 11, wherein the instructions, when executed, cause one or more processors of a machine to at least:

send a number of the second ones of cache line requests equal to a quantity of supplemental predictors programmable value.

14. The at least one non-transitory computer-readable storage medium of claim 9, wherein ones of cache line requests are first ones of the cache line requests, and the instructions, when executed, cause one or more processors of a machine to at least:

determine the reference block winner; and send third ones of cache line requests to the memory in response to the reference block winner determination, the third ones of cache line requests equal to the first ones of cache line requests.

15. The at least one non-transitory computer-readable storage medium of claim 9, wherein the plurality of predictor candidates includes at least one of a hierarchical search predictor candidate, a spatial predictor candidate, a supplementary predictor candidate, or a temporal predictor candidate.

16. The at least one non-transitory computer-readable storage medium of claim 9, wherein the instructions, when executed, cause one or more processors of a machine to at least:

remove redundant ones of predictor candidates of the plurality of predictor candidates.

17. An apparatus comprising:

means for obtaining a plurality of predictor candidates and sorting the plurality of predictor candidates in a priority order, the plurality of predictor candidates each indicating a memory location storing a reference block from a previous block; and means for sending ones of cache line requests to a memory, each of the cache line requests corresponding to a predictor candidate of the plurality of predictor candidates used for a motion search of a current source block, the cache line requests sent to the memory before a reference block winner of the previous block is determined.

18. The apparatus of claim 17, including means for:

sending additional ones of predictor candidates not used for the motion search of the current source block to supplemental predictor prefetch circuitry as ones of supplemental predictor candidates.

19. The apparatus of claim 18, wherein the ones of cache line requests are first ones of cache line requests, and including means for:
sending second ones of cache line requests to the memory, the second ones of cache line requests corresponding to at least one of the ones of supplemental predictor candidates.

20. The apparatus of claim 19, wherein the ones of supplemental predictor candidates include at least one neighbor predictor candidate to at least one of the plurality of predictor candidates.

21. The apparatus of claim 19, including a storage location for a quantity of supplemental predictors programmable value, and including means for:
sending a number of the second ones of cache line requests equal to the quantity of supplemental predictors programmable value.

22. The apparatus of claim 17, wherein ones of cache line requests are first ones of cache line requests, and including means for:
determining the reference block winner; and
sending third ones of cache line requests to the memory in response to the reference block winner determination, the third ones of cache line requests equal to the first ones of cache line requests.

23. The apparatus of claim 17, wherein the plurality of predictor candidates includes at least one of a hierarchical search predictor candidate, a spatial predictor candidate, a supplementary predictor candidate, or a temporal predictor candidate.

24. The apparatus of claim 17, including means for:
removing redundant ones of predictor candidates of the plurality of predictor candidates.

25. A method, comprising:
obtaining a plurality of predictor candidates, the plurality of predictor candidates each indicating a memory location storing a reference block from a previous block;
sorting the plurality of predictor candidates in a priority order; and
sending ones of cache line requests to a memory, each of the cache line requests corresponding to a predictor candidate of the plurality of predictor candidates used for a motion search of a current source block, the cache line requests sent to the memory before a reference block winner of the previous block is determined.

* * * * *